(12) United States Patent
Aiken

(10) Patent No.: US 11,005,342 B2
(45) Date of Patent: May 11, 2021

(54) SPIRAL HELIX ELECTROMAGNETIC LINEAR PULSE MOTOR

(71) Applicant: John Steven Aiken, Plano, TX (US)

(72) Inventor: John Steven Aiken, Plano, TX (US)

(*) Notice: Subject to any disclaimer, the term of this patent is extended or adjusted under 35 U.S.C. 154(b) by 384 days.

(21) Appl. No.: 15/487,531

(22) Filed: Apr. 14, 2017

(65) Prior Publication Data
US 2020/0235644 A1   Jul. 23, 2020

Related U.S. Application Data

(60) Provisional application No. 62/485,065, filed on Apr. 13, 2017.

(51) Int. Cl.
| | |
|---|---|
| *H02K 11/33* | (2016.01) |
| *H02K 1/14* | (2006.01) |
| *H02K 11/22* | (2016.01) |
| *H02K 3/18* | (2006.01) |
| *H02K 3/28* | (2006.01) |

(52) U.S. Cl.
CPC ............ *H02K 11/33* (2016.01); *H02K 3/18* (2013.01); *H02K 3/28* (2013.01); *H02K 11/22* (2016.01)

(58) Field of Classification Search
CPC . H02K 11/33; H02K 3/18; H02K 3/28; H02K 11/22
USPC .............................................. 310/68 D, 68 B
See application file for complete search history.

(56) References Cited

U.S. PATENT DOCUMENTS

| | | | | |
|---|---|---|---|---|
| 132 A | * | 2/1837 | Davenport | H02K 23/00 310/46 |
| 782,312 A | * | 2/1905 | Zehden | H02K 41/025 310/13 |
| 2004/0207280 A1 | * | 10/2004 | Luo | H02K 1/278 310/156.47 |
| 2006/0163969 A1 | * | 7/2006 | Nemoto | H02K 1/22 310/261.1 |
| 2011/0271867 A1 | * | 11/2011 | Liu | B60M 7/00 104/130.02 |
| 2013/0154397 A1 | * | 6/2013 | Sullivan | H02K 1/141 310/12.18 |
| 2016/0020653 A1 | * | 1/2016 | Ueda | H02K 1/2773 310/43 |
| 2016/0087516 A1 | * | 3/2016 | Makino | H02K 41/031 310/12.14 |
| 2016/0344312 A1 | * | 11/2016 | Trangbaek | H02K 49/102 |
| 2017/0212496 A1 | * | 7/2017 | Furukawa | H02K 11/215 |

* cited by examiner

*Primary Examiner* — Naishadh N Desai

(57) ABSTRACT

The Spiral Helix Electromagnetic Linear Pulse Motor is based on the three dimensional operational design Helix Rotation Concept, where the basic helix rotation concept, is a linear axis parallel electromagnetic pulse, or wave, created by the sequential activation, deactivation, and polarity reversal, of electromagnetic constructs arranged in a linear row, forming a linear array, parallel to the driveshaft axis, with a 360 degree spiral helix magnetic construct array around/along the length of the driveshaft, magnetically interacting with the electromagnetic pulse/wave created by the linear electromagnetic array. As a result of the electromagnetic wave/pulse traversing parallel to the axis across the linear electromagnetic array and synchronizing with the spiral helix magnetic array in a sequential linear manner, the device converts electromagnetic energy into continuous useful rotational mechanical energy.

1 Claim, 20 Drawing Sheets

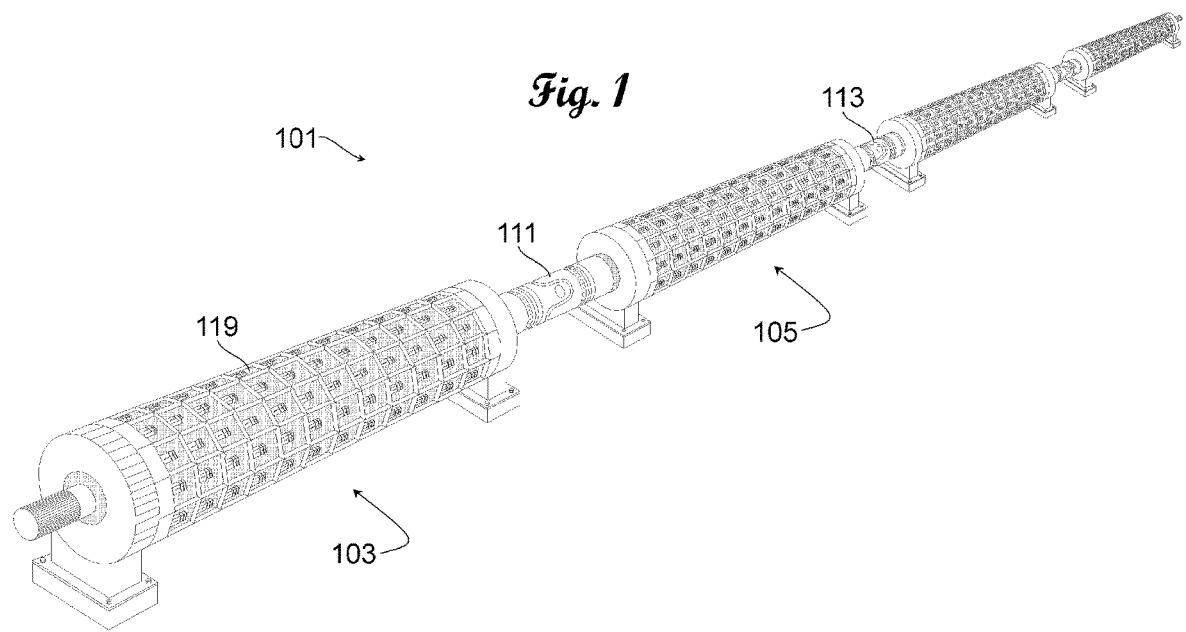

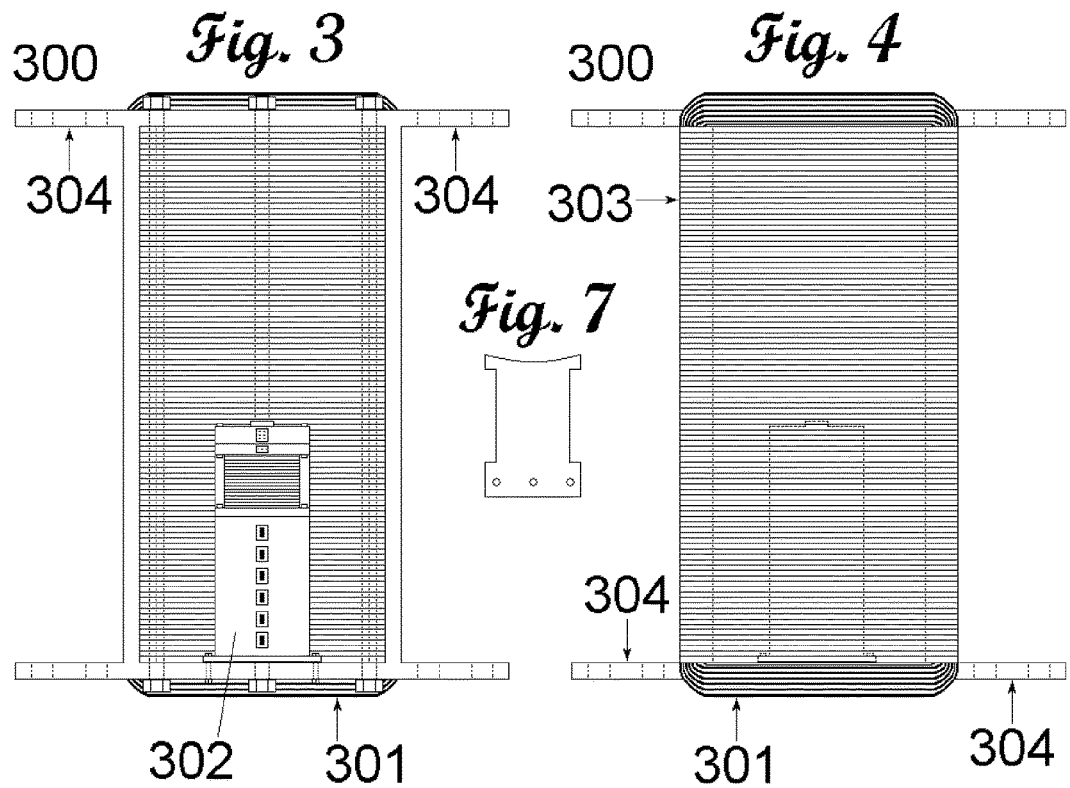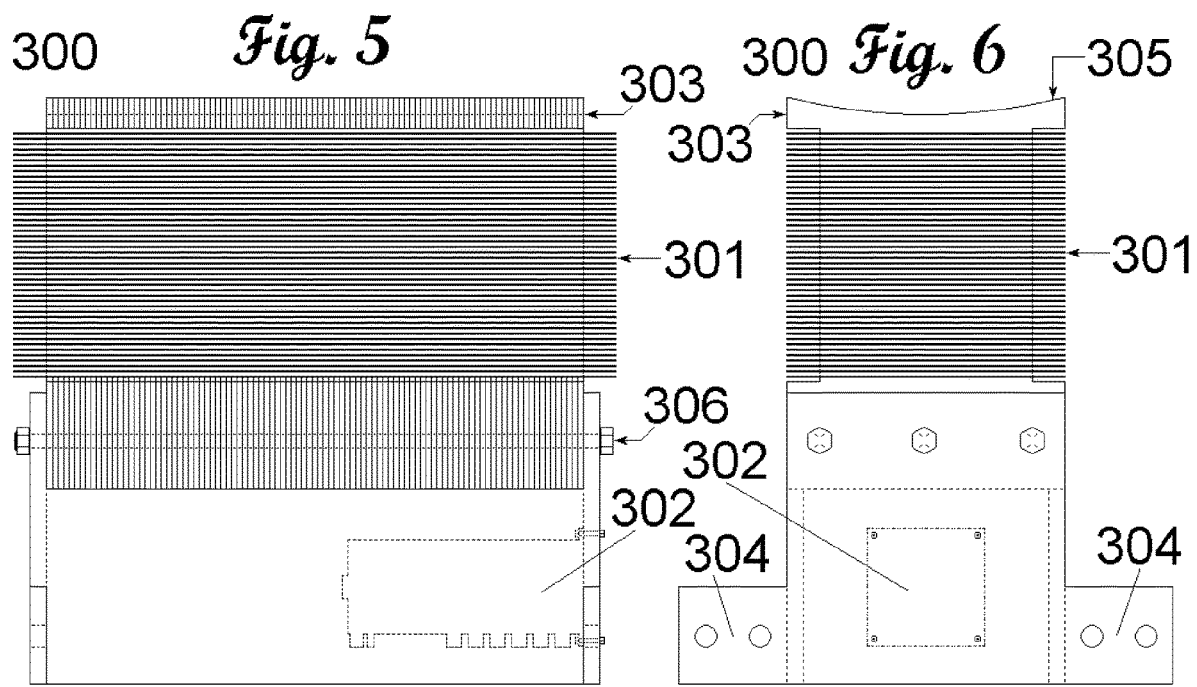

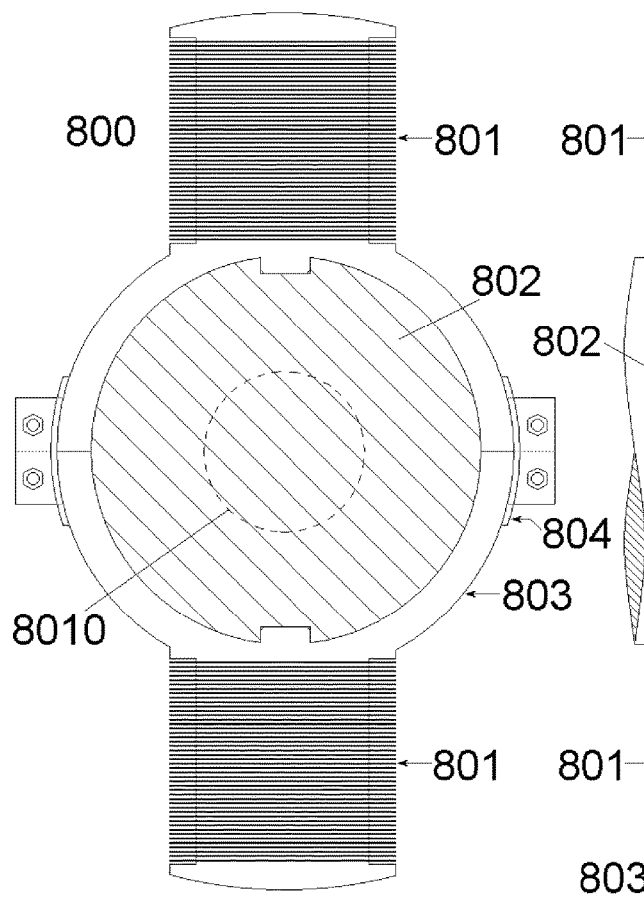
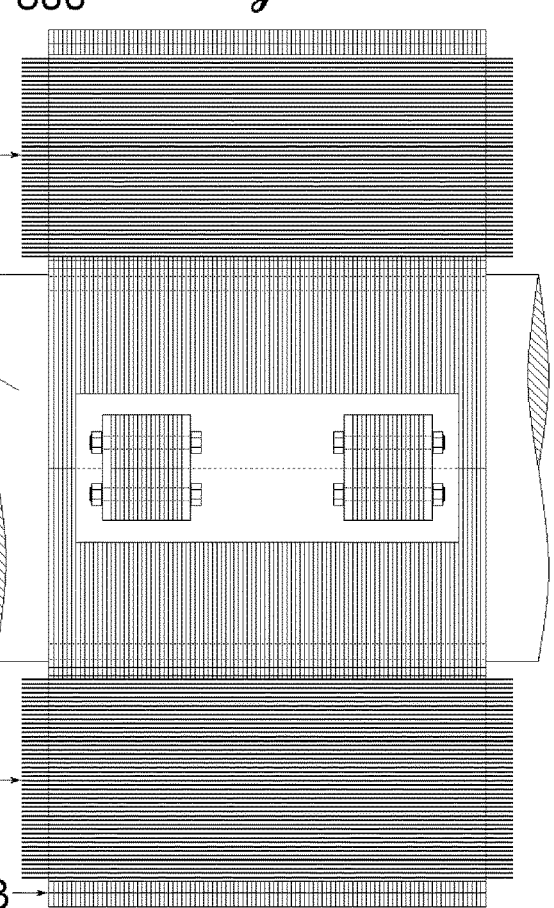
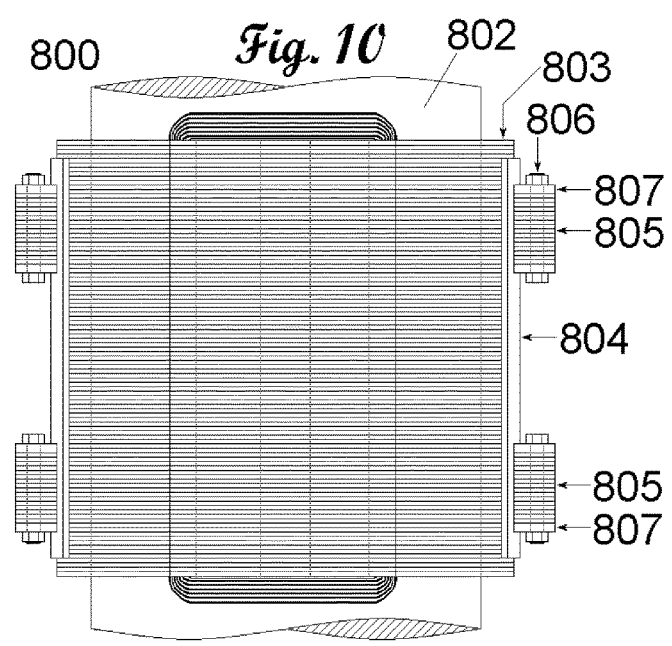
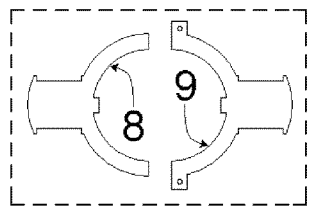
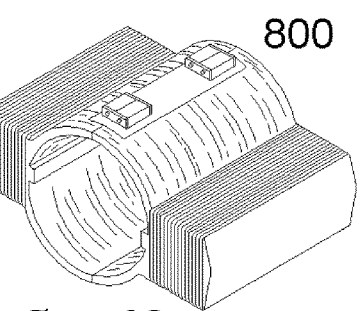

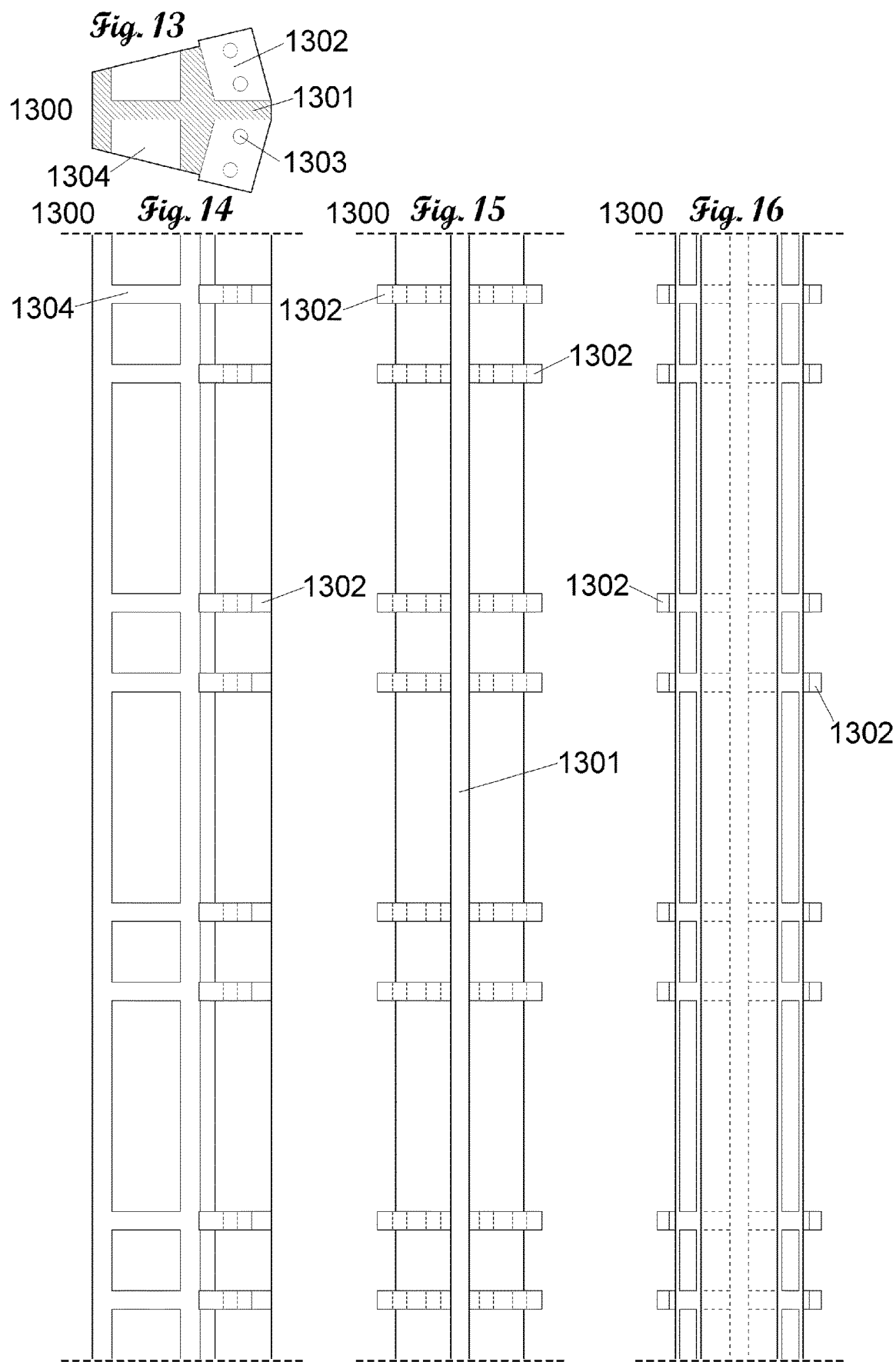

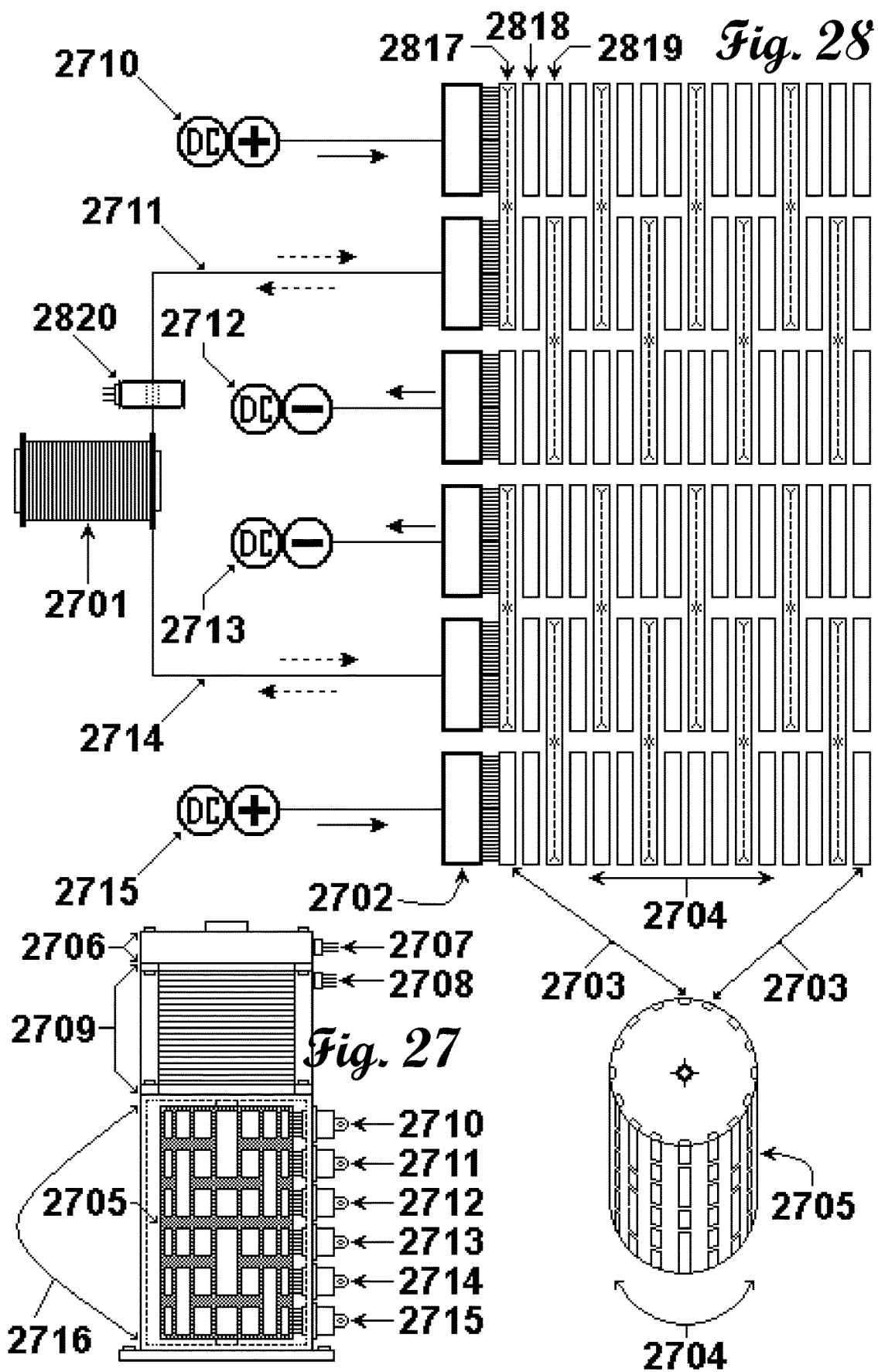

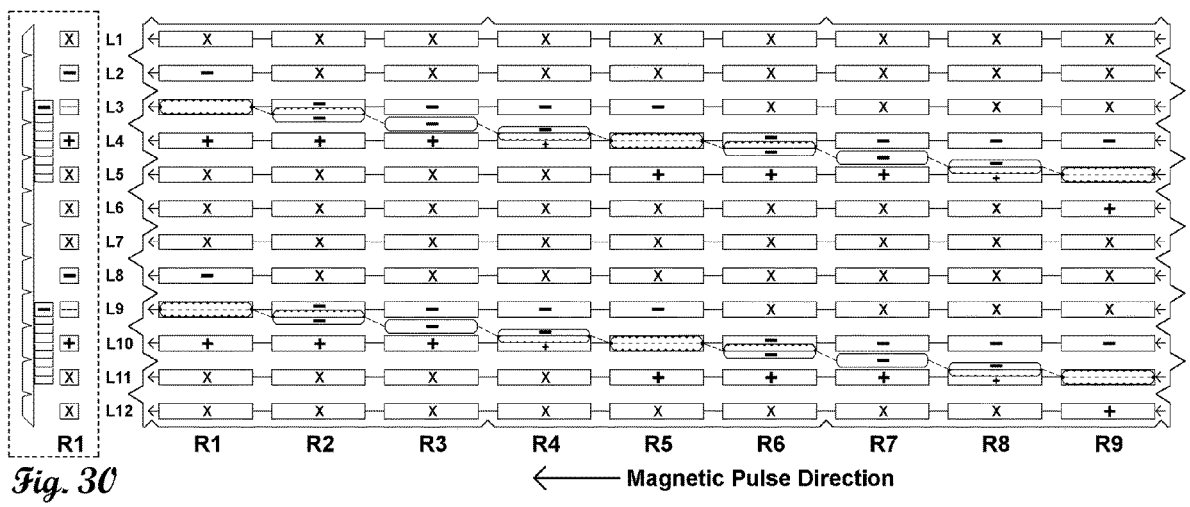

SPIRAL HELIX ELECTROMAGNETIC LINEAR PULSE MOTOR

BACKGROUND

1. Field of the Invention

The present invention relates generally to electromagnetic energy conversion into mechanical energy systems, and more specifically, to electromagnetic energy conversion into rotational mechanical energy devices.

The basic operational concept is a linear electromagnetic pulse created by sequential activation, and deactivation, of electromagnets arranged in a linear row, parallel to the axis, with a spiral helix magnetic array on the rotor, magnetically interacting with the linear array magnetic pulse. As a result of the electromagnetic pulse traversing across the linear array and synchronizing with the spiral helix magnetic array in a sequential manner, the device converts electromagnetic energy into continuous rotational mechanical energy.

2. Description of Related Art

Electromagnetic energy conversion devices are well documented in the arts and they cover two basic principles of operation. For convention sake, the current technology for creating rotational mechanical energy, will be referred to as an "Orbital Pulse Motor", and the current technology for creating linear mechanical energy will be referred to as a "Linear Pulse Motor".

Linear Magnetic Pulse and Orbital Magnetic Wave

One of the hallmarks of the orbital concept motor design, is the creation of a virtual magnetic wave that orbits the axis. It is the fundamental premise that allows them to function. The rotors ride those magnetic waves to achieve rotation. When viewed on a computer simulation of the electromagnetic interaction between the rotor and stator, there is a one-to-one correlation for that interaction. The difference between that one-to-one correspondence is the slip. When viewed on a computer simulation of the structure that the electromagnetic fields form as they orbit the axis, they create the appearance of a wave structure orbiting the motor axis relative to the number of magnetic poles the motor has. It is the natural result of each electromagnet being continuously energized, while also continuously reversing its polarity at the frequency of the motor. One of the hallmarks of the orbital concept motor, is that all of the electromagnets are in an energized state at one polarity or the other while the motor is running, with no rest periods.

One of the hallmarks of the helix concept motor design is the use of a magnetic pulse to achieve rotation. It is the fundamental premise that allows them to function. The spiral helix on the rotor rides that linear magnetic pulse to achieve rotation. When viewed on a computer simulation of the magnetic interaction between the rotor and stator, the magnetic fields on the linear magnetic arrays form a virtual magnetic pulse that travels across them. That magnetic pulse when viewed on the computer simulation is the result of each electromagnet starting in an unenergized non-magnetized state, energizing into one magnetized polarity state, momentarily dropping to an unenergized non-magnetized state, reenergizing into the reverse polarity magnetized state, and then ending in an unenergized non-magnetized state. As a result of that discrete off-On-oN-off sequence it creates an electromagnetic pulse form traversing the linear electromagnet array. The spiral helix magnetic array on the rotor is caught by and rides that electromagnetic pulse. Any individual electromagnet on the linear electromagnetic array is in an unenergized state for the majority (80%+of rotation for single spiral helix array motor) of each rotor rotation. The only time any given electromagnet on the linear array is energized, is when the spiral helix array magnetic construct on the driveshaft/rotor is in the magnetic interaction zone for that individual electromagnet on the axis linear array.

The orbital pulse motor establishing patent in the United States is U.S. Pat. No. 132, Feb. 25, 1837: Inventor: Davenport, Thomas: Invention:"Improvement in propelling machinery by magnetism and electro-magnetism" This device defined the concept of an actual or virtual orbital magnetic pulse to create rotary motion.

Davenport (U.S Pat. No. 132) teaches Sullivan, et al, that the basic orbital rotation concept, is where a virtual axis rotating magnetic field must be created by an axis orbiting stator interacting with an rotor construct oriented for an axis orbiting virtual rotating magnetic waves. The rotors magnetic construct requires a bar, or disk, or cylinder like structures designed to interact with the virtual rotating magnetic field. The rotation is produced by the interaction between a magnetically active bar, or disk, or cylinder, and a magnetically active orbital stator structure around the bar, or disk, or cylinder. To produce continuous rotation in a two-dimensional operational concept orbital motor, there must be a virtual magnetic wave or pulse that orbits in a relatively perpendicular plain (360 degrees coverage) around the driveshaft axis. That basic magnetic physical property must occur, in order to create an inequality differential for force/attraction/repulsion to be created, for rotation to be possible. Otherwise it will not function. On the Notice of References Cited received on Jun. 22, 2020, all the cited patents examples follow Davenport orbital virtual rotating magnetic field concept motors. The provided cited example drawings show the designs for orbital stators, and orbital rotor constructs for using the two-dimensional axis orbital operational concept. Two-dimensional operation electromagnetic motors are when all the functional operational components can be represented fully on a two-dimensional plane. (Flatland)

Rule 1: A orbital motor must create a virtual axis orbiting rotating magnetic field to function.

Rule 2. An orbital motor will not function without a virtual axis orbital rotating magnetic field.

Rule 3. An electromagnetic motor that does not create an axis orbital rotating magnetic field cannot be an orbital concept motor.

Davenport teaches that the minimum requirement to achieve rotation is to create an axis orbital magnetic stator that has a minimum of two (2) magnetic poles, and a rotor that has a minimum of two (2) magnetic poles in order to create a virtual magnetic pulse or wave that orbits the driveshaft axis and a rotor that can interact with that virtual orbital rotating magnetic wave. All electromagnetic motors currently patented and constructed, follow that fundamental rule. Without at least two poles on the stator, an orbital virtual rotating magnetic wave cannot be created.

An exception for electromagnetic rotational devices not meeting the 2:2 rule, is the Spiral Magnetic Pulse Motor, where the rotation is achieved for 90% of rotation by a magnetic gradient created by permanent magnets, with an electromagnetic pulse at the maximum magnetic attraction point allowing it to have continuous rotation. The magnetic gradient and the electromagnet are considered having met the 2 magnetic pole requirements for the stator, while the rotor is only required to have one magnetic pole which creates an exception to the 2:2 rule. Even with that different concept for creating rotation, it still uses the two-dimensional axis orbital magnetic pulse/wave concept to produce rotation. The axial flux motor uses the three stator positions available for the two-dimensional operational concept rotor construct. It uses the rim and both sides of the disk to create the virtual orbital rotating magnetic fields for producing rotation. All current electromagnetic motor designs are predicated on creating a virtual axis orbital magnetic wave as the first fundamental principal of motor design.

The linear pulse motor establishing patent in the United States is U.S. Pat. No. 782312, Oct. 1, 1907: Inventor; Zehden, Alfred: Invention; "ELECTRIC TRACTION APPARATUS" This device defined the concept of a virtual or actual linear magnetic pulse to create linear motion.

One significant technological impediment for an electromagnetic orbital pulse motor, is the thermal load problem. Current orbital pulse motors occupy a volume, which is essentially a cube, or a sphere. Those types of physical shapes have the highest volume per surface area, which serves to increase thermal retention. Orbital pulse motors are primarily increased in power by two methods. The first method is to increase the diameter of the rotor and the stator. The second method is to increase the energy input density. The first method leads to increasingly massive component size as the mass of the motor components increase exponentially as the designed energy input capacity increases, and quickly become massively heavy. The large monolithic mass, poses a significant challenge for transporting to an installation site, involves a substantial challenge to complete onsite repair, and it requires a significant, large monolithic volume of space, for the motor to occupy.

The increase in input energy density method, leads to increasingly overwhelming thermal loads. While thermal loads are not usually a significant problem for most small orbital pulse motors, it starts to become an increasingly significant problem as the physical mass of the motor increases. For the largest motors, trying to reduce the thermal load becomes an overwhelming engineering problem for achieving high energy input. Increasing the input energy density level in an orbital pulse motor eventually reaches the point where meltdown occurs, even with the best thermal abatement systems.

The electromagnetic linear pulse motor suffers the inherent concept limitation of only creating linear mechanical energy. That limitation inhibits its range of uses. The conversion of electromagnetic energy into rotational mechanical energy, has the most useful potential.

BRIEF SUMMARY OF THE INVENTION

The Spiral Helix Electromagnetic Linear Pulse Motor uses the concept of a linear magnetic pulse that runs parallel to the axis of a rotor to convert electromagnetic energy into mechanical energy. The linear magnetic pulse interacts with a spiral helix magnetic array attached to the rotor. As the linear magnetic pulse traverses across the linear magnetic array parallel to the axis, it magnetically interacts with the spiral helix magnetic array attached to the rotor, creating rotational mechanical energy, and then the cycle repeats, thus creating continuous rotation. Increasing mechanical energy output, is achieved primarily by increasing the length of the motor which increases the energy input capacity without increasing the average energy input density per cubic volume.

Aiken teaches All, that the basic helix rotation concept is a linear axis parallel electromagnetic pulse, or wave, created by the sequential activation, and deactivation, of electromagnets arranged in a linear row forming a linear array, parallel to the driveshaft axis, with the spiral helix magnetic construct array on the rotor, magnetically interacting with the magnetic pulse/wave created by the linear electromagnetic array. As a result of the electromagnetic wave/pulse traversing parallel to the axis across the linear magnetic array and synchronizing with the spiral helix magnetic array in a sequential manner, the device converts electromagnetic energy into continuous useful rotational mechanical energy.

Aiken teaches All, that the minimum number of magnetic poles on a helix motor two-dimensional axis orbital stator slice is one, and the minimum number of magnetic poles on the spiral helix two-dimensional axis orbital rotor slice is one. (See FIG. 32 "Basic Spiral Helix Motor Slice View") In three-dimensional spiral helix operational space, the Helix Motor takes advantage of the nature of sine waves, in that an object orbiting an object while following a parallel path, creates a naturally perfect helix. The Spiral Helix Electromagnetic Linear Pulse Motor is using that same basic astrophysics property. The linear magnetic array in three-dimensions, is interacting with the spiral helix magnetic array creating continuous rotation. Without the third operational dimension, a helix motor would just be an orbital one stator-one pole rotor motor. Those kind of two-dimensional one stator pole/one rotor pole orbital concept motors do not function. They fail to follow Davenport for the creation of a two-dimensional orbital concept motor. All orbital concept motors do not need or use the third operational dimension to function. If each two-dimensional slice of a basic helix motor is viewed from a two-dimensional viewpoint, then it would fail to meet the basic requirements for electromagnetic motor design and would not function. The helix motor only exists when viewed from a three-dimensional perspective, because its basic operational concept only occurs in three-dimensional space.

The discovery of the electromagnet, with its controllable properties of magnetic attraction, and magnetic repulsion of other electromagnets, initiated a significant intellectual effort on how to convert those properties into useful mechanical energy. After many trials and errors by many inventors, it was discovered that a virtual orbital magnetic pulse, could be created to caused an armature to rotate perpendicular around a motor shaft axis. The virtual orbital magnetic pulse, magnetically attracted and repulsed, the armature around in a repetitive sequential orbital motion, thus creating continuous rotation. (U.S. Pat. No. 132)

The second concept conceived for the conversion of electromagnetic energy into mechanical energy is the Linear Induction Motor. (U.S. Pat. No. 782,312) The linear induction motor reconfigured the orbital magnetic pulse concept by rolling it out into a linear magnetic pulse concept. The linear magnetic pulse concept, established a method to move objects along a linear magnetic track converting electromagnetic energy into linear mechanical energy. The inherent concept limitation of only creating linear mechanical energy, limits its uses to those applications using that type of mechanical energy. The linear magnetic pulse motor is a one dimensional concept, wherein the magnetic pulse only traverses either forward, or backward, in one dimension.

The orbital magnetic pulse concept is a two dimensional concept, wherein the magnetic field interactions creating rotation, remain represented on a two dimensional plain diagramming its operational functionality. The Spiral Helix Electromagnetic Linear Pulse Motor, combines the one dimensional linear pulse concept, with the two dimensional orbital pulse concept, and extends it into three dimensions.

In the present invention, an electromagnetic motor is presented having the one dimensional linear pulse concept, combined with the two-dimensional orbital pulse concept, thereby extending the operational functionality into a three dimensional concept. The three dimensional operation is achieved by reconfiguring a circular magnet array into a spiral helix magnet array, wherein a three hundred and sixty degree circular magnet array, is virtually sliced and stretched out, with the ends remaining on the same plain, resulting in forming a spiral helix magnet array continuing to cover three hundred and sixty degrees of rotation. The result is a spiral helix magnet array configured to extend around a rotor along its length. The stator electromagnets that surround an orbital pulse rotor are thereby reoriented into three dimensions by creating linear electromagnet assemblies that run parallel to the rotor axis so that the sequential magnetic pulses travel parallel to the axis. When energized in operation, the magnetic pulse traverses across the linear electromagnet array, with the pulse magnetically interacting with the spiral helix magnetic array creating rotation. The linear magnetic pulse then repeats the sequential pulse cycle, and thus creates continuous rotation.

In full operation, the present invention with fully populated electromagnet linear arrays, will create linear moving magnetic fields. Using visualizations of the magnetic fields as they energize, de-energize and reverse polarity, they will appear to be rotating in a similar effect like an old spiral helix barber shop pole rotating. It creates that rotating visual effect, even while the magnetic pulses are actually travelling parallel to the spiral helix axis. The visual effect is created because, on a spiral helix linear motor that includes the maximum number of linear arrays possible for the designed motor circumference, the linear arrays create full orbital arrays for each magnetic pole on the spiral helix rotor array. The orbital arrays virtually function in the same manner as any other two dimensional orbital pulse motor as the sequential linear magnetic pulses traverse the linear electromagnet arrays.

Additional Embodiments of Spiral Helix Electromagnetic Linear Pulse Motor

Orbital concept motor design types use different magnetic constructs/fabrications to create the interacting magnetic fields. The use of direct current, alternating current, induction motors, permanent magnets, and other methods that are used to make different types of orbital concept motors. The Helix Rotation Concept also has different design types of helix motors. Additionally, the Helix Rotation Concept vastly increases the scalability of electromagnetic motors by enabling current human technology to fabricate useful nano class, and gigawatt class electromagnetic motors, as well as megawatt and kilowatt class. A helix motor is not restricted in the number of linear arrays that interact with the spiral helix magnetic constructs array on the rotor/driveshaft, and the spiral helix magnetic array on the rotor can be of any design and material that has the ability to interact and respond to magnetic fields. As such there are four basic types of electromagnetic helix motors. The first type is the pure DC motor where all electrical power is delivered as Direct Current from source to electromagnet, and the spiral helix magnetic array is created using DC electromagnets. The second type is the electrical power is converted to solid state up to the electromagnet, where the frequency of the alternating current, is decoupled from the frequency of the electromagnet, and converted to direct current electromagnets magnetizing truncated induction fabrications on the spiral helix array. The third type of helix motor replaces the magnetic induction fabrication on the spiral helix array with permanent magnets. The fourth type is the nanoscale helix motor version which solves the technical and design problems that orbital concept nanoscale motors cannot overcome. For all the different types, or designs of a helix motor, under operation, they are all stationary objects within the environment of their assembly. They cannot produce any linear motion, or linear thrust in and/or of itself. Helix motors will only, and are designed specifically, to produce stationary axis rotational motion, which here is defined as "mechanical rotational torque".

Spiral Helix Electromagnetic Linear Pulse (Direct Current) Motor

This type of helix motor can be built today with common fabrication materials, but it would be obsolete before it left the drawing board. The design has many engineering problems that hinder it during operation for the most powerful versions. Direct Current is the first problem. While the maximum DC current loads really needed for a high-power helix motor are relatively low, (<500 volts) they still generate more heat and have higher losses than Alternating Current. The massive number of contact points, constantly needing to be replaced, makes DC designs relegated to low output designs. Fortunately, using $21^{st}$ century technology instead of 1890's technology generally solves the problems by conversion from Direct Current to Alternating Current using induction and/or permanent magnet helix motor designs. Helix motors that are designed to use only direct current, are relegated to small demonstration devices for education purposes.

Spiral Helix Electromagnetic Linear Pulse (Induction) Motor

Provisional Patent Application: USPTO 62938072 (ABANDONED) Invention Name—Spiral Helix Solid State Linear Pulse Motor; File Date: Nov. 20, 2019. This provisional application was abandoned as being redundant and an extenuation of the current application. The provisional application USPTO 62938072 includes a much more detailed, but still incomplete explanation of the solid-state version of the helix motor alternating current conversion from direct current. The information is to be considered a part of this application as reference. In (USPTO 62938072, FIG. 2), the basic circuit diagram for conversion of a helix motor power delivery system uses thyristors and rectifiers in place of direct current contacts. The number of axis stator linear arrays is significantly increased, and they cover the full circumference of the driveshaft/rotor to enable a virtual rotating orbital wave form to be created across the induction construct/fabrication. (USPTO 62938072, FIG. 3) The virtual rotating wave form is created by the magnetic pulses traversing across the multiple of linear arrays. Helix induction motors that have axis linear electromagnet arrays around the full circumference of the spiral helix array on the rotor, are able to create a virtual orbiting electromagnetic field wave as an artifact of the electromagnetic pulses traversing across each individual axis linear array in sequence over the full circumference of the driveshaft/rotor spiral helix array.

The helix motor is a three-dimensional operating concept machine, and as a result, it can have the properties of the two-dimensional orbital concept motor (orbiting virtual magnetic wave) in addition to its three-dimensional operating properties (linear virtual magnetic pulse) when it is designed as a helix induction motor. The direct current electromagnets on the spiral helix array, are replace with truncated squirrel cage type induction constructs. The inner surface that the linear arrays form around the circumference of the driveshaft/rotor becomes the track for the truncated induction construct to travels on and in effect driving the rotor. This type is best and will be primarily used for industrial processes requiring a constant speed mechanical rotational torque output. While the induction version of the helix motor can be used as a variable speed, variable power motor, the rotational direction response time, and power level output variability are much higher. The helix permanent magnet version is used where infinite variable power output, and rotational speed within the design limits, is the required output parameter for the mechanical rotational torque produced.

Spiral Helix Electromagnetic Linear Pulse (Permanent Magnet) Motor

The permanent magnet version of the helix motor is very similar in design to the helix induction motor version. The linear arrays are powered by the same use of thyristors and rectifiers using alternating current up to the electromagnet where it is converted to direct current for energizing the electromagnet. The spiral helix array magnetic fabrication uses permanent magnets such as Neodymium-Iron magnets custom shaped for the spiral helix array spiral shape on the driveshaft/rotor. Since neodymium magnets cannot be unlimited in circumference or thickness to increase their magnetic strength, which limits the maximum size they can fabricated before the magnetic fields produced cease increasing in strength, and the magnetic fields begin to diffuse and loose cohesion across the surface of the magnet. That ultimately limits the maximum size and power a permanent magnet motor can obtain using the orbital rotation concept. Electromagnets and rotor induction constructs can generate much higher magnetic field strengths than permanent magnets, and as such are used for the largest electromagnetic motors. The helix rotation concept allows large scale, high power permanent motors, because each node or slice of the motor is not required to have maximum power. The many low power nodes/slices of the helix motor working together will outperform the single node/slice of an orbital concept motor. Example: A permanent magnet helix motor that can produce 100 hp per node and has 300 nodes, will produce 30,000 hp, while a maximum power orbital concept permanent magnet motor of the same diameter might produce 1000 hp. Helix motors power output is determined by how long they are, since the longer they are, the more node/slices there are to produce output. Permanent magnet helix motors are very efficient just like in orbital concept motors. For high torque applications, where electrical efficiency, reduced power consumption, and variable speed are required over the initial cost, then the permanent magnet helix motors are used. Where cost is of more of a concern and the helix motor will operate at a constant speed, then helix induction motors are used.

Spiral Helix Electromagnetic Linear Pulse (Nano) Motor

On the nano scale, it has proven to be an all but insurmountable task to try and build an Orbital Concept Motor. A major problem is axis orientation. Because the orbital concept requires an orbiting magnetic field to function, it would necessitate that a ring of stator nano electromagnets be constructed around the rotor construct. It can be done one of two ways; the nano-electromagnets ring can go around an axis that is perpendicular to the substrate, which means the nano-electromagnets will have to be created in a vertical orientation instead of horizontal orientation, or they need to be constructed in a circle perpendicular to the substrate around a deep embedded rotor. Current state of the art, and foreseeable technology, does not allow either axis orientation to be built with the overwhelming technological challenges it faces. It is not feasible, practical, or realistic, to expect that the challenges will be overcome for nano scale orbital concept motors. Due to the basic nature of the Helix Rotation Concept, it allows for solutions of the problems inherent in the fabrication of useful nano scale electric motors.

The Helix Rotation Concept is well suited to the build nano scale spiral helix electromagnetic linear pulse motors in addition to the high megawatt, and gigawatt scale designs, as contrasting to the Orbital Rotation Concept which is limited to the kilowatt and low megawatt range. The Orbital Rotation Concept uses the circle as its' fundamental operating principle, while the Helix Rotation concept uses the line as its' fundamental operating principle. On the nano scale, straight line features are the easiest to construct with any current or anticipated technology and represents the most attainable nano construction ability.

Like all spiral helix motors, a nano helix motor is a long, straight, and thin structure. The semiconductor material on the driveshaft/armature has a spiral helix of iron oxide to form the spiral helix magnetic array construct on the driveshaft/rotor as a single uninterrupted continuous track. The bearings on each end are of the dimple design for a fan type motor, or for a working driveshaft/rotor motor with output shaft, an open top semi-arch over the output driveshaft/rotor will hold it in place for that type of basic nano helix motor. Fan type propulsion motors are created by having the spiral helix iron oxide magnetic construct track made thicker to raise it to a higher elevation from the surface of the rotor creating a spiral helix fan like structure. Uses include an integrated-on chip fan, or outside propulsion motors for nanobots. All those features are already achievable with current levels of standard semiconductor technology. It is relatively easy to acid wash waste material from away from the helix nano rotor and bearings since there is not a large wide overlaying structure that would need to be etched under or be deep in the substrate.

The nano-electromagnetic linear array is formed by a straight-line row of separate semiconductor nano electromagnets in the embedded layers directly under the driveshaft. (Refer to FIG. 37) A straight line of simple nano-electromagnets with a delay circuit between each electromagnet allows a virtual electromagnetic pulse to be created to travel across the embedded linear array of nano-electromagnets. The nano electromagnetic linear array has simple circuits that cause the electromagnets to energize and deenergize in sequence to create a virtual electromagnetic pulse down the linear array. There is no need for polarity reversal since the nano helix motor works by electromagnetic attraction to iron only. The iron oxide spiral array on the shaft will begin rotating in the direction of the electromagnetic pulse in relation to the curvature of the spiral array. The iron compound spiral helix can be in a vane or blade shape where the outside edge runs the iron compound spiral helix with the vane/blade going to the axis. It creates a spiral helix screw. In that shape/configuration, the motor itself is the propulsion blade and drive for pushing against liquids, air, or semi-solids. The spiral helix screw driveshaft just needs to be solid at the ends to fit into and be stabilized by the dimple bearings. It is not required for the linear magnetic pulse to "magnetically catch" the spiral helix iron oxide array every time. As the pulse travels across the linear array in one direction it provides a constant electromagnetic pull on the rotor spiral array creating a continuous rotation motion as the rotor catches and slips while rotating. Nano helix motors do not require perfect synchronization between the rotor and linear array stator to still function correctly. The current flow just needs to be reversed for the shaft to rotate in the opposite direction. A helix nano motor is always self-starting in any shaft position. Having a long structure with a smaller diameter is a requirement for nanites cruising through capillaries on a mission. A helix nano motor solves the problem of creating a propulsion system for nanites.

Mechanical engineering insight into the Helix Rotation Concept, adds historical prior art connection understanding. In the world of Mechanical Engineering, there are many basic, fundamental engineering constructs used for larger purposes. One of those basic constructs, is the use of a helical slot in a cylindrical tube, interacting with a linear mechanical force, thus converting it to a semi-rotational mechanical force. That has been a fundamental mechanical engineering concept for many decades, if not centuries. The idea of making spiral slots on opposite sides of a cylinder, and inserting pegs/cogs in the slots, which are then pushed and pulled in the cylinder, while the pegs/cogs remain in the same plainer orientation, causing the cylinder to rotate in the direction of the spiral slots, is an ancient idea. It is a very easy way to convert linear mechanical energy into useful, but limited, rotational mechanical energy.

Referring to FIG. 33, the drawing is of a recent patent from circa 1981 for a device that uses the helical slot concept to create a rotary valve. The helical cylinder, Item 54, has two spiral slots, Items 56 and 58, one on each side, the degrees of rotation being determined by the length around the cylinder of the slotted cuts. The linear mechanical force, is provided by the shaft, Item 18, using pegs/cogs Items 24 and 22, which are inserted into the slots on the helical cut cylinder, and through the collar sleeve, Item 12, which provides the plainer orientation stability for the linear push rod shaft. The helical slot rotation method is a well-known, and fundamental mechanical engineering concept.

The Helix Rotation Concept, as exemplified by the Spiral Helix Electromagnetic Linear Pulse Motor, is the equivalent version in electrical engineering. The mechanical Helical Rotation Concept has been translated/transferred from mechanical engineering to electrical engineering as the Helix Rotation Concept. The linear push rod shaft, Item 18, and the stability collar, Item 12, are the equivalent to the linear electromagnetic array stators, and the helical slot cylinder, Item 54, is the equivalent of the spiral helix electromagnetic array on the driveshaft rotor. They both operate in the same basic 3-dimensional fashion, with a linear mechanical energy force being used to interact with a helical slot construct creating rotation, and the helix motor using linear electromagnetic energy interacting with a spiral helix electromagnetic array for rotation. While the mechanical constructs have very limited rotation, the helix motor achieves continuous rotation. Referring to original Drawing Sheet 10/14: FIG. 25, the basic layout, and even the appearance of the drawing shows, it has the same fundamental conceptual operation. The linear arrays across the top and bottom of the spiral helix motor in FIG. 25, are equivalent to the straight slot grove of the rotary ring collar providing the linear force (30, 32), and the spiral helix electromagnetic array (2502), is representative of the helical slots on the rotation cylinder (54).

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 is an oblique view of a spiral helix electromagnetic linear pulse motor in accordance with a preferred embodiment of the present application;

FIG. 2 is a side view of a partially assembled motor with the top and bottom linear arrays installed and the Spiral Helix Rotor Array of FIG. 1;

FIG. 3 is a top view of a linear electromagnet assembly of FIG. 1;

FIG. 4 is a bottom view of a linear electromagnet assembly of FIG. 1;

FIG. 5 is a side view of a linear electromagnet assembly of FIG. 1;

FIG. 6 is an end view of a linear electromagnet assembly of FIG. 1;

FIG. 7 is an end view of a magnetic core template for the electrical steel lamination cutout form use to create the magnet core from FIG. 6;

FIG. 8 is end view of a rotor electromagnet assembly in accordance with the present application;

FIG. 9 is a side view of the rotor electromagnet assembly of FIG. 8;

FIG. 10 is a top view of the rotor electromagnet assembly of FIG. 8;

FIG. 11 are template views for the electrical steel lamination cutout forms use to build the magnet core of the rotor electromagnet assembly of FIG. 10;

FIG. 12 is an isometric view of the rotor assembly of FIG. 8;

FIG. 13 is a cross sectional view of a support beam in accordance with the present application;

FIG. 14 is a side view of the support beam of FIG. 13;

FIG. 15 is a top view of the support beam of FIG. 13;

FIG. 16 is a bottom view of the support beam of FIG. 13;

FIG. 27 is a simplified diagram of a Digital Control Commutator;

FIG. 28 is a simplified chart of a Digital Control Commutator contact sequence in accordance with the present application;

FIG. 29 is a simplified operations chart in accordance with the present invention; and FIG. 30 is a an end view of an operating motor in accordance with the present invention.

Figure 17:
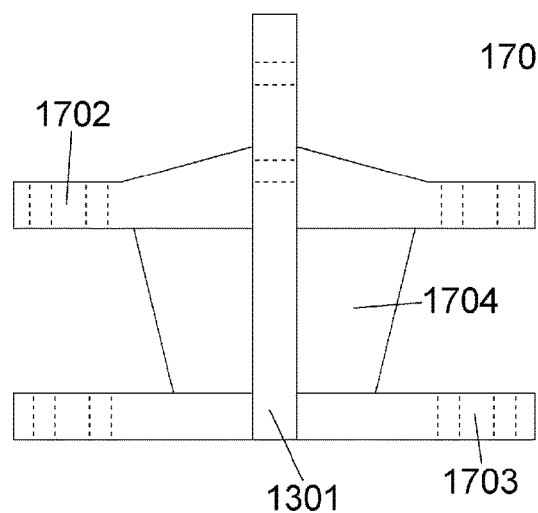
FIG. 17 is an end view of an end of the support beam of FIG. 13.
Figure 18:
FIG. 18 is a side view of the end of FIG. 17.
Figure 19:
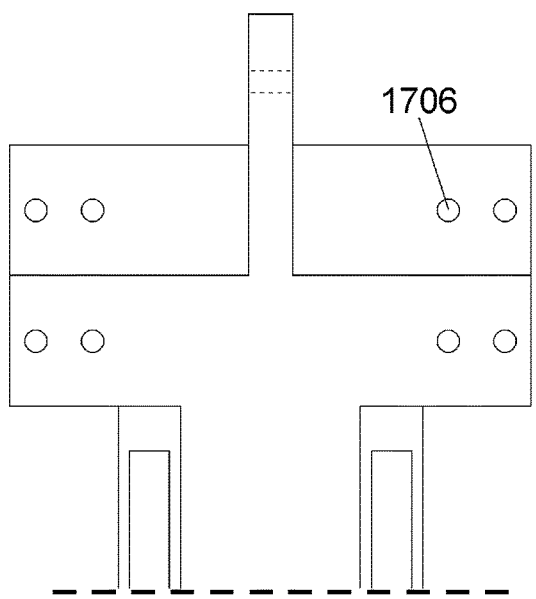
FIG. 19 is a bottom view of the end of FIG. 17.
Figure 20:
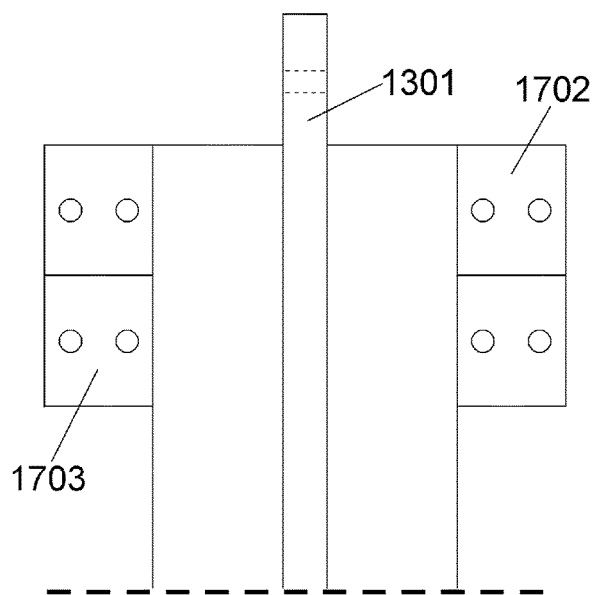
FIG. 20 is a top view of the end of FIG. 17.

While the systems and methods of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional electromagnetic motors. Specifically, the present invention provides a means to increase power capacity without increasing the thermal signature, or limiting the potential output power, while allowing current manufacturing capabilities the ability to create the construct. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention, and its application and practical use to enable others skilled in the art to follow its instructions.

Referring now to the drawings, wherein like reference characters identify corresponding or similar elements throughout the several views, FIGS. 1 and 2 depict an oblique view, and a side view of a spiral helix electromagnetic linear pulse motor 101 in accordance with a preferred embodiment of the present application. It will be appreciated that motor 101 overcomes one, or more of the above-listed problems commonly associated with conventional electromagnetic rotational motor systems.

In the contemplated embodiment, motor 101 includes one or more motor units 103, 105 connected by one or more expansion joints 111, 113. It should be appreciated that the expansion joints allow for motor 101 to be modular and increase linearly in size, thereby increasing the power of motor 101. In the preferred embodiment, each unit includes a plurality of linear electromagnetic assemblies 119.

In FIGS. 3-7, various views of an example of a linear electromagnetic assembly 300 is shown. Assembly 300 can include a plurality of wire coils 301 configured to surround a ferromagnetic core 303. Assembly 300 further includes one or more Digital Control Commutator(s) 302 configured to control the electrical energy flow associated with motor 101. It is contemplated that the ferromagnetic core 303 can be composed of a laminated electrical steel sheet. Assembly 300 can further include one or more connection tabs 304 for securing to a plurality of support beams (shown in FIGS. 13-16). Each assembly 300 further includes a curved face 305 configured to match the curvature of a rotor. Assembly 300 further includes a plurality of bolts 306 configured to hold assembly 300 together.

In FIGS. 8-12, various views of a rotor assembly 800 used in motor 301 are shown. Assembly 800 includes a plurality of coils 801 surrounding a ferromagnetic core 803 and a rotor 802, with optional hollow rotor core implementation 8010. Assembly 800 further includes one or more center connection reinforcement plates 804 and one or more laminated connection tabs 805 joining the rotor electromagnet assembly together, and one or more bolts 806 configured to hold assembly 800 together. Assembly 800 can further include one or more reinforcement end plates 807 configured to provide a means for the lamination connection tabs to join the rotor electromagnet assembly together. In FIGS. 11, 8 and 9 indicate the template for the electrical steel cutting pattern for the laminated core with and without a connection tab.

In FIGS. 13-20, various views of a linear array support beam 1300 are shown. Support beam 1300 includes a central I-beam or equivalent structure 1301 and one or more electromagnet assembly connection points 1302 having a plurality of bolt holes 1303. The connection points and bolt holes are configured to provide a location to attach a plurality of support beams and the plurality of linear electromagnetic assemblies together around a central rotor. The assemblies further include top end connection points 1702 and bottom end connection points 1703. Each beam can further include a reinforcement flange 1704 and additional bolt holes 1705 for securing the support structure together.

Figure 21:
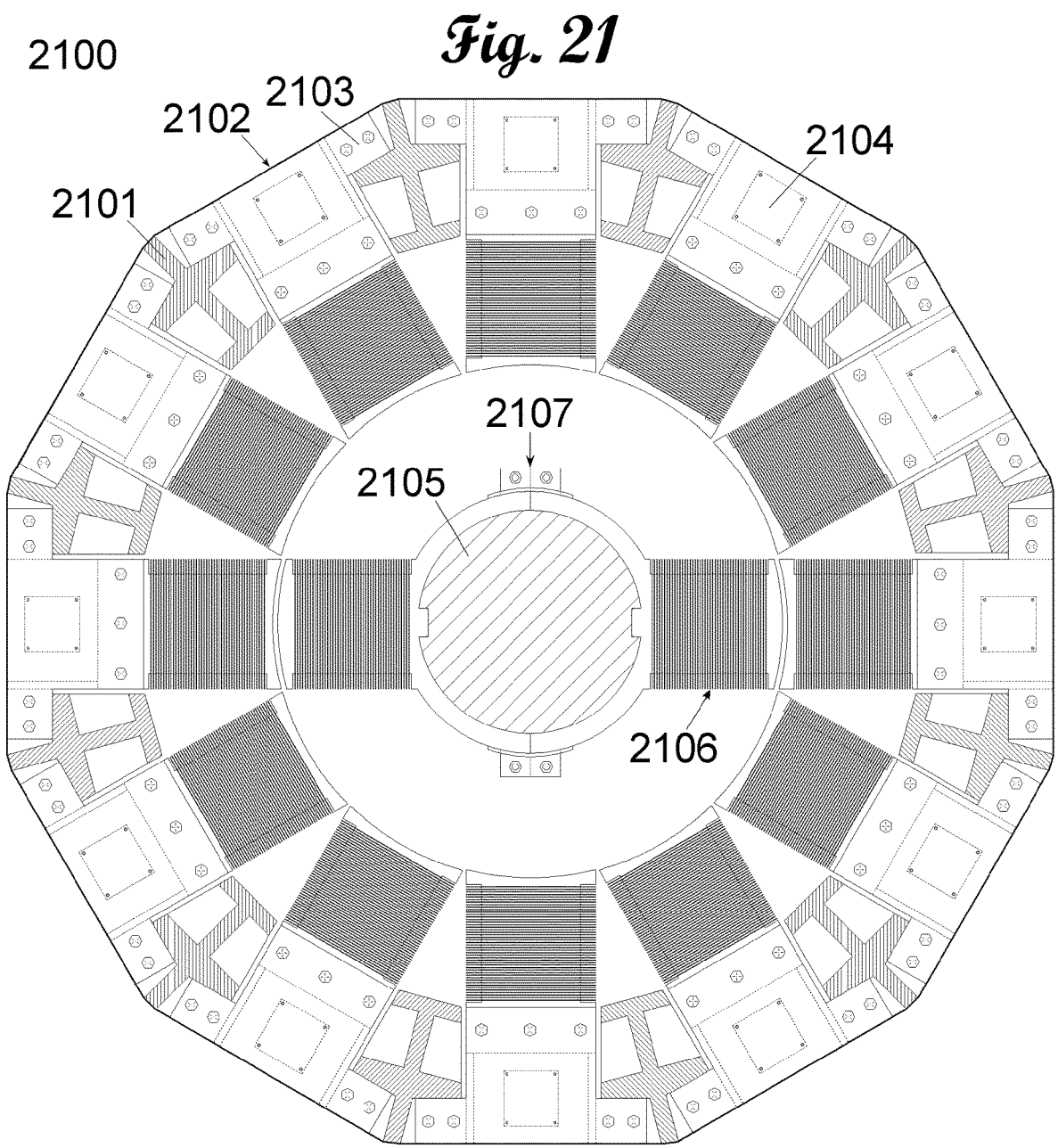
FIG. 21 is a cross sectional view of an assembly of a spiral helix electromagnet arrays on a rotor shaft in accordance with the present application.

In FIG. 21, a cross sectional view of an assembly 2100 of the plurality of linear electromagnetic assemblies and the plurality of support beams is shown. As depicted, assembly 2100 includes alternating support beams 2101 and electromagnetic assemblies 2102 attached by connection joints 2103. This arrangement surrounds a rotor shaft 2105 and rotor shaft electromagnets 2106. The rotor includes one or more connection joints 2107. Assembly 2100 includes a plurality of Digital Control Commutator(s) 2104, further discussed in FIG. 27.

Figure 22:
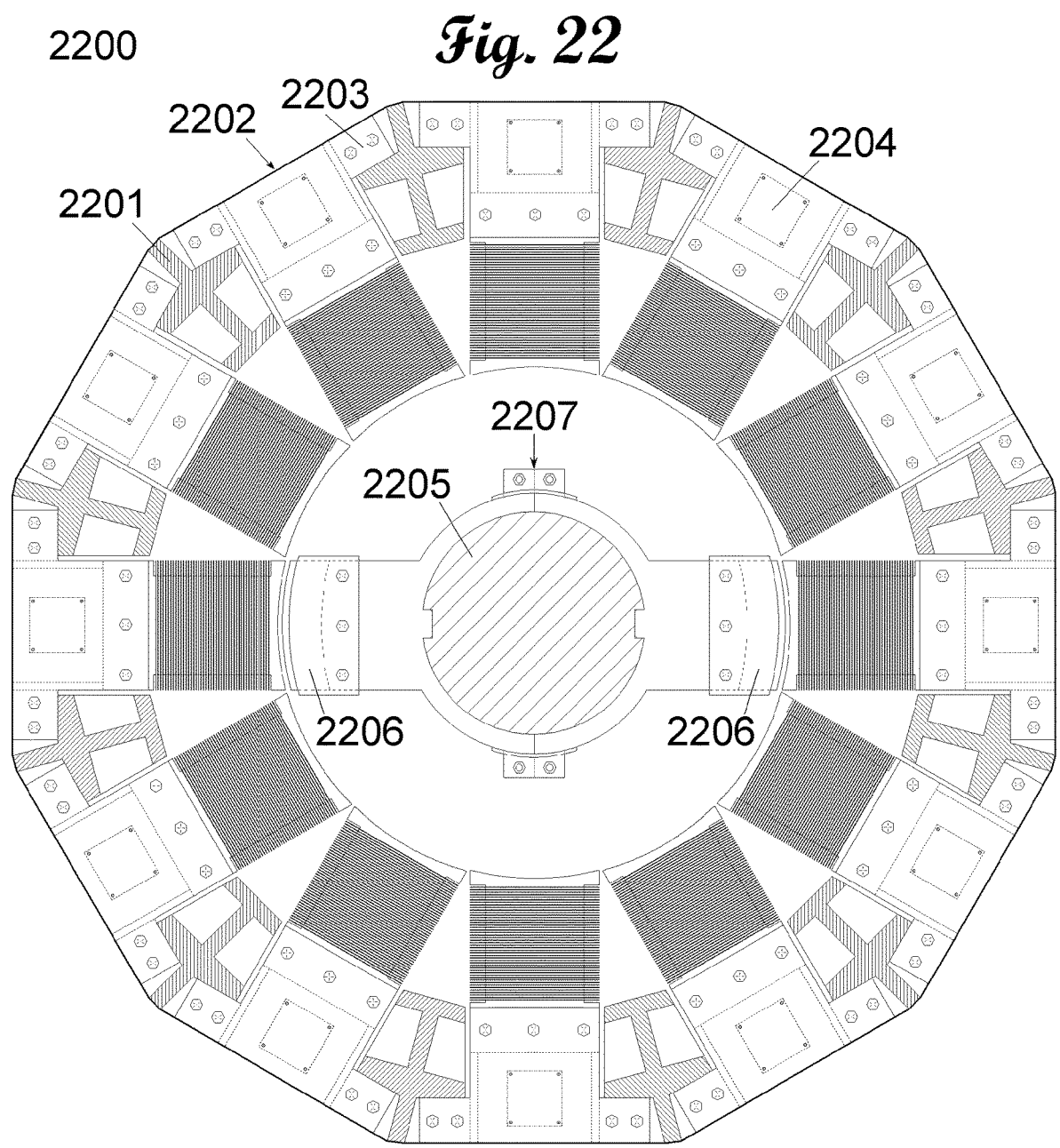
FIG. 22 is a top cross sectional view of an assembly of a spiral helix permanent magnet arrays on a rotor shaft in accordance with the present application.

In FIG. 22, a cross sectional view of an assembly 2200 of the plurality of linear electromagnetic assemblies and the plurality of support beams is shown, wherein assembly 2200 includes a permanent magnet rotor shaft 2206 as well as the features discussed above and associated with assembly 2100, including the alternating support beams 2201 and electromagnetic assemblies 2202 being connected by connection joints 2203 and a plurality of Digital Control Commutator(s) 2204. In addition, assembly 2200 includes one or more connection joints 2207 of a rotor shaft 2205.

Figure 23:
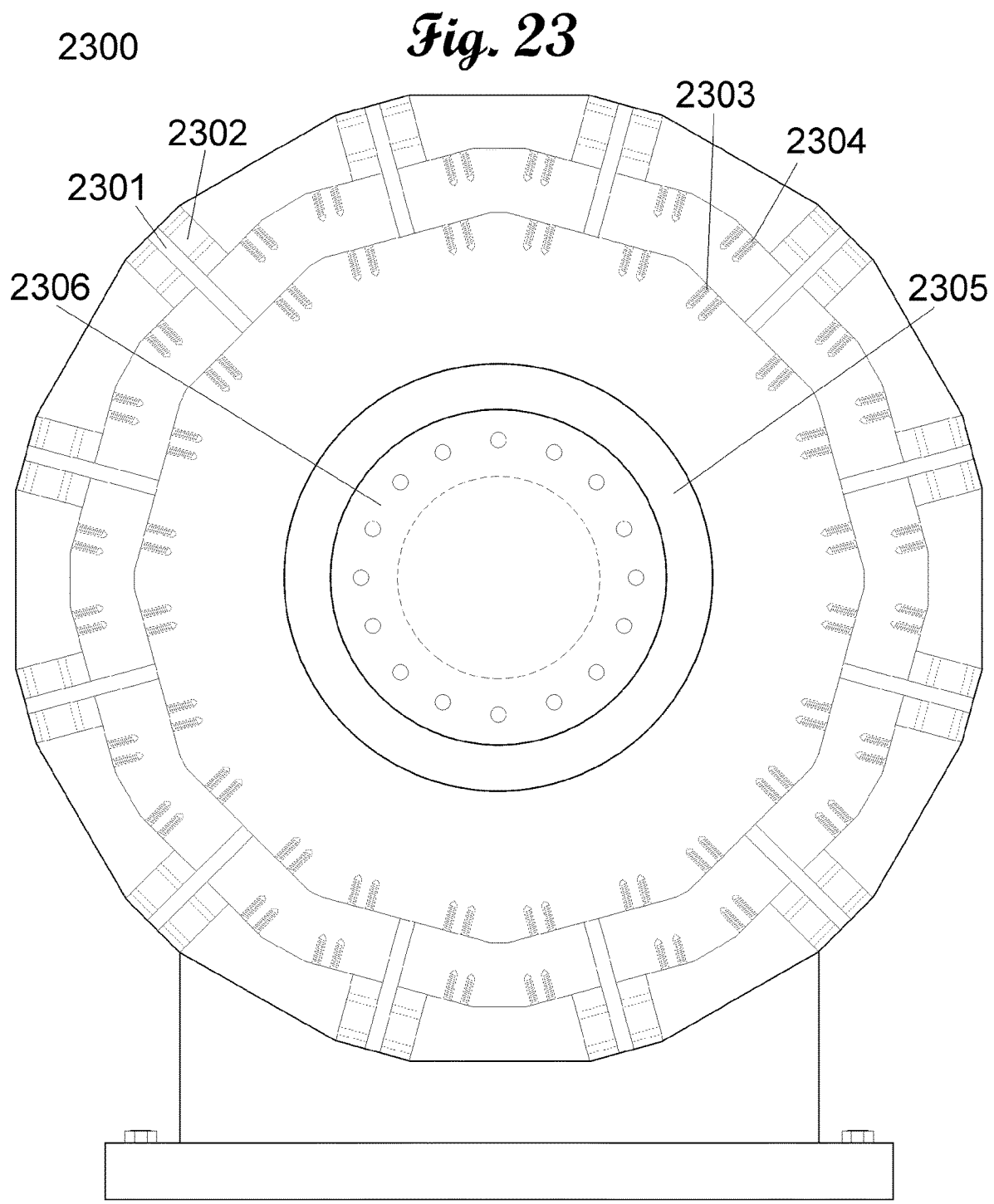
FIG. 23 is a view of a motor bearing housing face in accordance with the present application.

In FIG. 23, an interior view of a faceplate 2300 for use with motor 101 is shown. Faceplate 2300 includes one or more connection attachment slots 2301 configured to secure to the plurality of support beams and one or more connection attachment slot support tabs 2302 configured to further secure the attachment slots to the support beams. Plate 2300 includes a plurality of bolts 2303, 2304 for further securing the assembly together. Plate 2300 includes a main thrust bearing shaft thrust plate 2305 and a drive shaft rotor connection flange 2306 with optional hollow core driveshaft shown.

Figure 24:
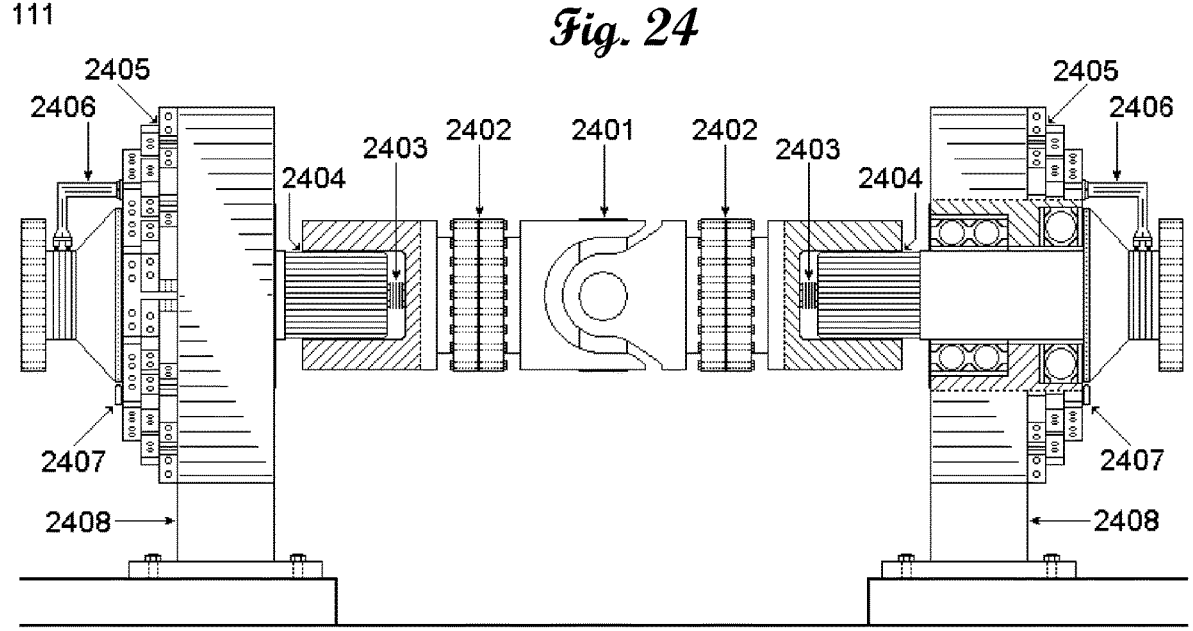
FIG. 24 is a side view of a connection expansion joint for use with the spiral helix electromagnetic linear pulse motor of FIG. 1.

In FIG. 24, an example of an expansion joint 111 is shown. Expansion joint 111 includes a universal connection joint 2401 configured to provide the motor with length flex points. One or more rotor drive shaft bolted slip joints 2402, are configured to provide a means for assembling and disassembling the motor units of FIGS. 1 and 2. One or more expansion connection centering mechanisms 2403 are configured to allow for expansion of joint 111. It is contemplated that mechanism 2403 can be a spring, hydraulic, or of pneumatic components. Joint 111 can further include one or more expansion connection joint free movement spaces 2404. Expansion joint 111 further includes one or more connection points 2405 configured to secure to the plurality of linear array support beam ends and one or more spiral helix rotor electromagnet commutator brush supports 2406. In addition, joint 111 can include one or more rotor driveshaft absolute optical position encoders 2407 and one or more spiral helix motor pedestal supports 2408.

Figure 25:
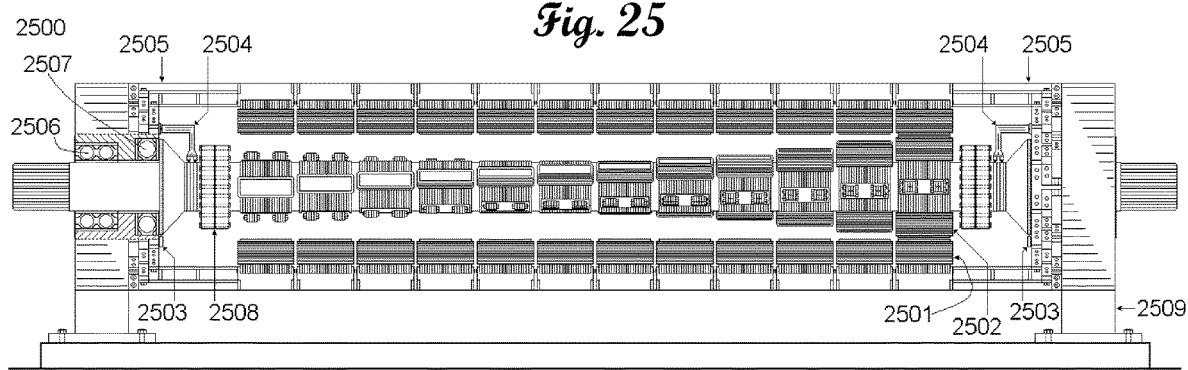
FIG. 25 is a side view of a partially assembled motor of FIG. 1.
Figures 26A, 26B:
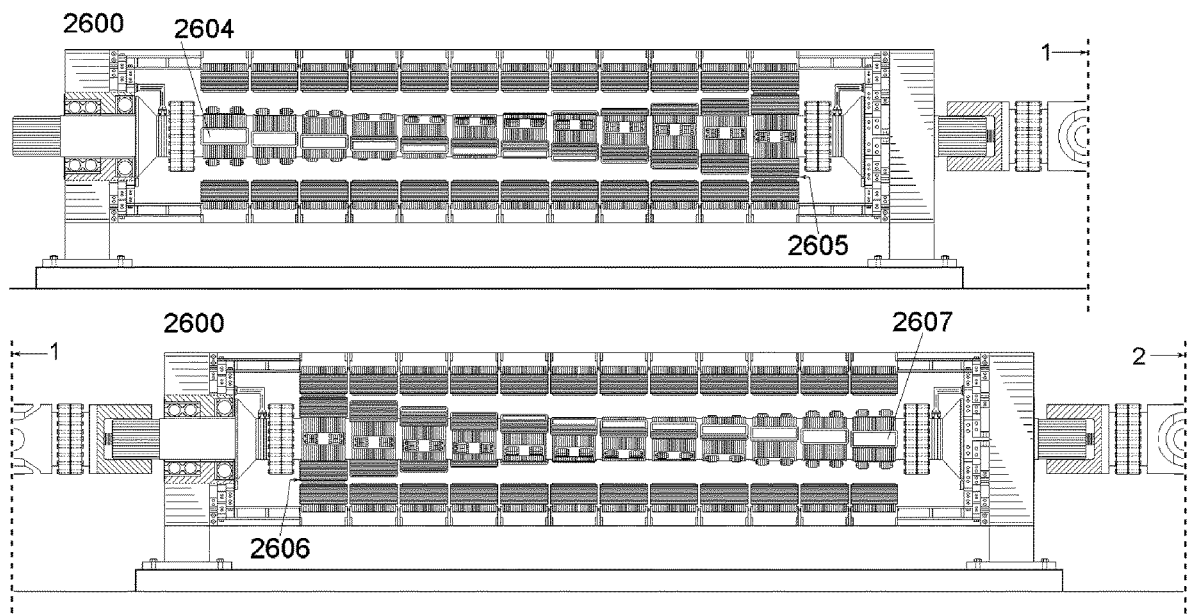
FIGS. 26a-d are side views of a partially assembled motor of FIG. 1 showing the angle rotation of the spiral helix magnet array in accordance with the present application.
Figure 26D:
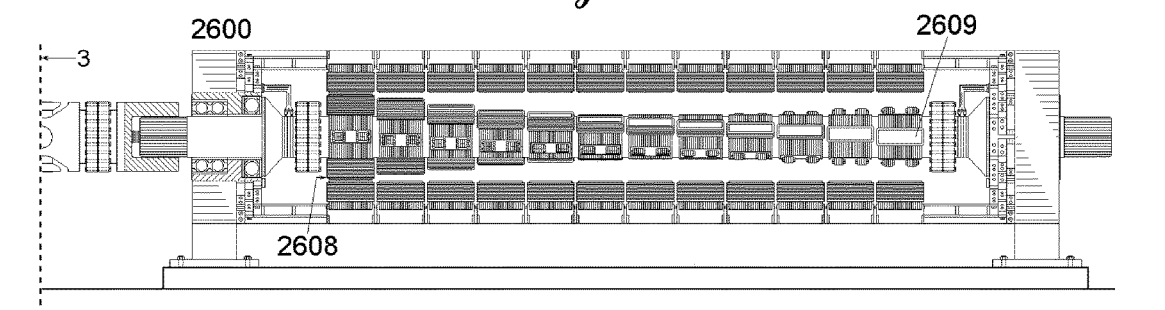
Figure 26C:
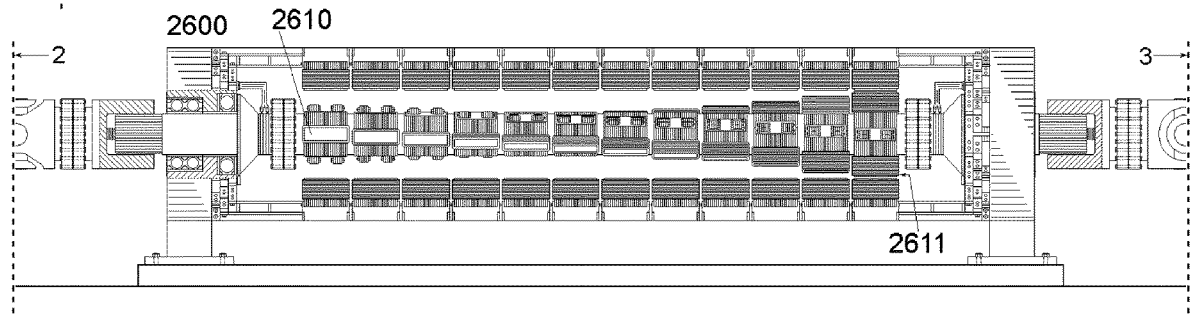

In FIG. 25, a partially assembled motor 2500 in accordance with the present invention is shown. Motor 2500 includes a linear array electromagnet 2501 and a spiral helix array electromagnet 2502. In addition, motor 2500 includes one or more rotor drive shaft absolute optical position encoders 2503 configured to control the movement of electromagnetism. In the preferred embodiment, motor 2500 further includes a spiral helix rotor electromagnet commutator brush support 2504. A linear support beam 2505 is shown, as well as a drive shaft rotor main support bearings 2506, drive shaft rotor thrust bearings 2507, rotor drive shaft bolted slip joints for assemble and disassembly 2508, and a spiral helix motor pedestal support 2509.

In FIGS. 26a-d, partially assembled views of a four section motor 2600 are shown. It should be noted that dashed lines 1-4 indicate points of joining the various views of motor assembly 2600. The figures show a complete rotation of the spiral helix electromagnet array for the full 360 degrees of rotational coverage. In these figures, 2604 and 2605 depict the spiral electromagnetic surface at the beginning of 0 degrees rotation to 90 degrees rotation, 2606 depicts the spiral electromagnetic surface at 90 degrees rotation, 2607 depicts the spiral electromagnetic surface at 180 degrees rotation, 2608 depicts the spiral electromagnetic surface at 180 degrees rotation, 2609 depicts the spiral electromagnetic surface at 270 degrees rotation, 2610 depicts the spiral electromagnetic surface at 270 degrees rotation, and 2611 depicts the spiral electromagnetic surface at 360 degrees rotation.

FIGS. 27 and 28 depict diagrams of a Digital Control Commutator (DCC) used in motor 100. The DCC is designed to connect direct current to an electromagnet, reverse the direct current flow from one direction to the opposite direction, and control the power flow while under direct digital control. The DCC includes three basic parts, a digital control stepper motor 2709, a rotational absolute angle detection sensor 2706, and a commutator 2716, while working in conjunction with a closed loop current flow detection sensor used as an electrical contact brush failure indicator 2820, and includes one or more DC current carbon metallic or equivalent contact brushes 2702. The DCC energizes a direct current ferromagnetic core electromagnet 2701, Lines 2703 indicate splitting open the commutator cylinder 2705 for a plainer view. Lines 2704 indicate the bi-rotational direction of cylinder 2705. Commutator cylinder 2705 includes a non-conductive cylinder with conducting metallic inserts in a specific pattern to allow current flow to energized, de-energize, and reverse polarity as commutator 2705 rotates. The DCC includes a power and signal connection 2707 for optical absolute encoder, and a power and control input 2708 for the stepper motor. In addition, the DCC can include multiple connections 2710-2715 for directing current flow.

In FIG. 28, rows 2817 and 2819 of commutator contacts provide electrical connections for the direct current to flow in opposite directions from one another. Row 2818 of commutator contacts is a non-connection null row configured to provide a non-connection stop/delay position for the commutator.

The stepper motor is rotated under digital feedback control to energize an electromagnet with precise digital timing signals to create current flow in one direction, and then reverse the current flow in the opposite direction with precise digital control timing signals, additionally it has the ability to remain stationary in any current flow or non-current flow position.

The commutator is composed of a core material that has conducting metallic inserts in a pattern that creates segmented metallic rings around the commutator core. The segmented rings are aligned to create parallel axial rows. The six segmented rings form two groups of three contact rings each. One group of contact rings is aligned to match the DC current input and output brushes, and the contact brush for one electromagnet coil lead wire and the other group of contact rings is aligned to match the DC current input, output brushes, and the contact brush for the other electromagnet coil lead wire.

The rows have three patterns as following, one row has six insert segments with no interconnections 2818, and thus does not provide a closed electrical connection. Two rows have four insert segments with two pairs of segments creating two closed electrical connections (2817, 2819) and thus current can flow through them. Those two groups of row patterns are alternated back and forth to create an alternating reversing current flow path, with the frequency of current reversal, and current supply, digitally controlled by rotational speed, rotational angle position, and rotational direction.

FIG. 29 depicts an operational sequence chart associated with the present invention. Chart represents a spiral helix motor section that has been cut open, and laid out flat on a plain. The rectangle boxes represent the outside electromagnet linear arrays. (L1-L12) The ovals represent the underlying spiral helix magnet arrays. The spiral helix magnet arrays represented by the ovals, are rotating from the top, down to the bottom of the chart. The spiral helix magnet array creates a full time uninterrupted magnetic field. The magnetic polarity does not change, so the magnetic fields can be generated by constantly energized electromagnets, or permanent magnets. When the ovals representing the spiral helix magnet arrays reach the bottom of the chart they will reappear back at the top of the chart and the cycle repeats.

The letter number combination on the left side indicated by (L1-L12) signifies Linear array 1, Linear array 2, . . . , Linear array 12. The linear electromagnet arrays form the linear magnetic pulse by energizing, de-energizing, and reversing polarity in linear sequence. The letter number combination across the bottom of the figure (R1-R9) represent rings of electromagnets around the rotor formed by the linear electromagnet arrays. At position (L1:R1) the rectangle box contains an "X", which indicates the electromagnet is de-energized. At position (L2:R1) the rectangle box contains an "−", which indicates the electromagnet is energized, "South pole". At position (L4:R1) the rectangle box contains an "+", which indicates the electromagnet is energized, "North pole". At position (L3:R1) the rectangle box contains oval dashed lines representing the rotor magnet directly aligned with the linear electromagnet ring.

The electromagnetic sequenced pulse traverses from the right side of the chart, to the left side of the chart. The pulse is created by the Digital Control Commutator(s)(DCC) (FIGS. 27, 28) energizing the electromagnets on the linear arrays in timed sequence to magnetically attract, and magnetically repulse, the magnets on the spiral helix magnet array. The timing of the sequence, and magnetic pulse, is dependent on the require operating performance of any given moment during operations. That is all under the control of the digital operating system. As the spiral magnet array rotates, the linear electromagnet arrays creates motion by magnetically interacting in the following ways: At position (L3:R1), the rotor magnet is directly opposite the linear array magnet, and in that position the linear electromagnet is de-energized as the DCC rotates the contacts to the reverse polarity position. The length of time the linear magnet is de-energizes is dependent on the spiral helix motors current operating parameters, though the time is usually as short as possible while the rotor is revolving. The spiral helix magnet remains constant with the negative(south) magnetic polarity. The position (L2:R1), shows the negative(south) polarity repulsing the rotor magnet before it has been de-energized. The position (L4:R1), shows the positive(north) polarity electromagnet attracting the spiral helix rotor negative (south) polarity.

As the spiral helix rotor magnet turns past the direct linear electromagnet opposing position, at the position (L3:R2), the linear electromagnet is energized with a negative(south) polarity, repulsing the spiral helix magnet negative(south) polarity. At position (L4:R2), the linear electromagnet is energized with a positive(north) polarity attracting the spiral helix magnet negative(south) polarity. At position (L3:R3), the linear electromagnet is energized with a negative(south) polarity, with the spiral helix magnet at midpoint between linear array(L3:R3) and linear array(L4:R3), it repulses the spiral helix magnet negative(south) polarity. At position (L4:R3), the linear electromagnet is energized with a positive(north) polarity attracting the spiral helix magnet negative(south) polarity. At position (L3:R4), the linear electromagnet is energized with a negative(south) polarity, it repulses the spiral helix magnet negative(south) polarity. With the spiral helix magnet almost rotated to the direct opposite position to the linear array(L4:R4), the linear electromagnet at position(L4:R4) is energized with a positive(north) polarity attracting the spiral helix magnet negative(south) polarity. All the spiral helix rotor magnets go through the same sequence as the positive(north) and negative(south) electromagnetic pulses travel down each linear electromagnet array. All magnetic polarities are dependent upon the design characteristics of the specific motor implementation.

In FIG. 30, an end view of an operating motor is shown, wherein a ring of electromagnets is represented by R1.

Figure 31:
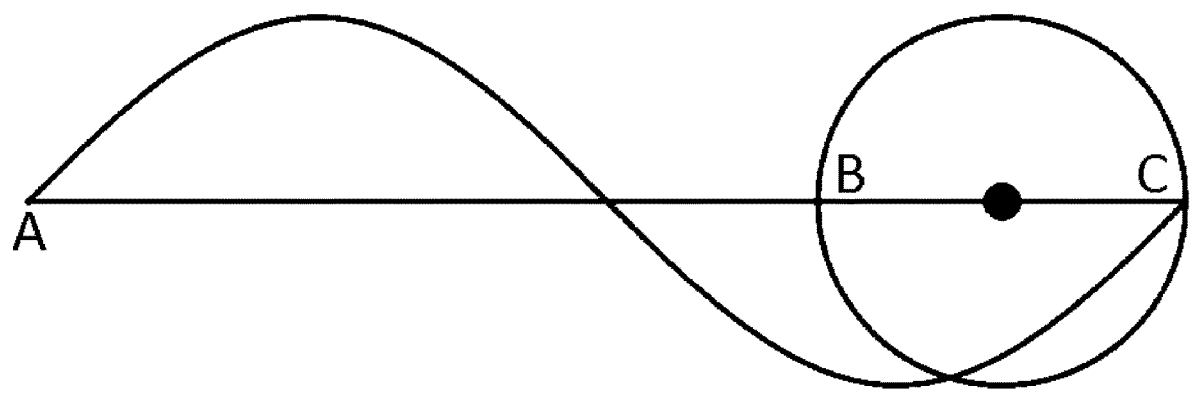
FIG. 31 is a two-dimensional graphic representing a three-dimensional helix motor.

FIG. 31, graphic "ABC", shows a representation of a three-dimensional helix motor in two-dimensions. Points A-C represents the axis parallel linear magnetic array and the axis of the device. Points B-C represent the diameter of the spiral helix, which forms a sine wave when viewed in two-dimensions. A two-dimensional orbital operational motor would only be represented by the circle formed by the diameter B-C, and the dot in the center of the circle for the axis. The two operational concepts only exist in the different dimensions they occupy.

Figure 32:
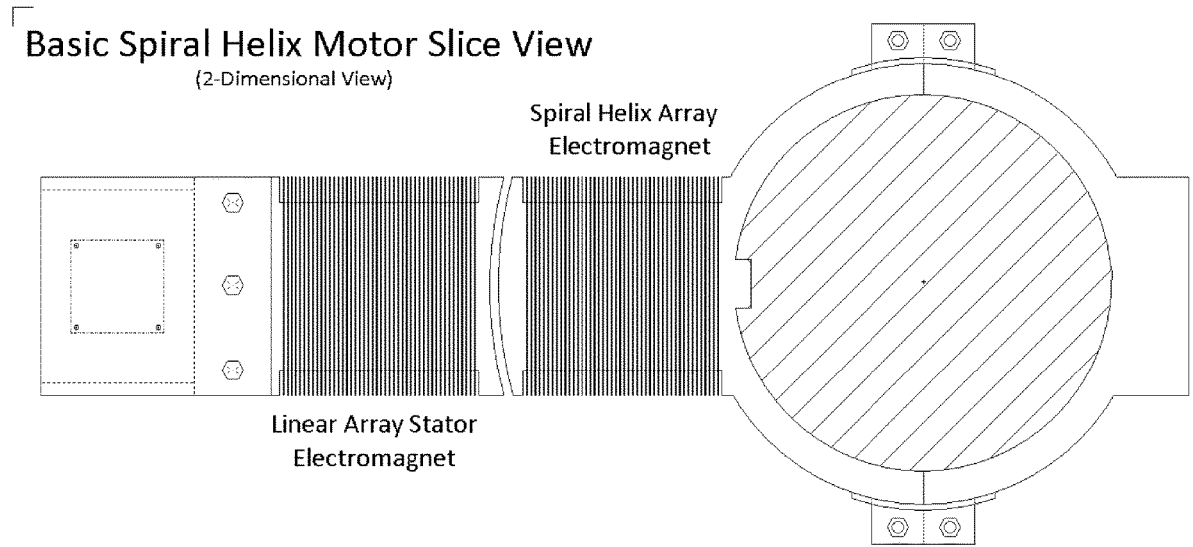
FIG. 32 is a "Basic Spiral Helix Motor Slice View", of a two-dimensional slice across the driveshaft axis, for the minimum required components of a three-dimensional helix motor.
Figure 33:
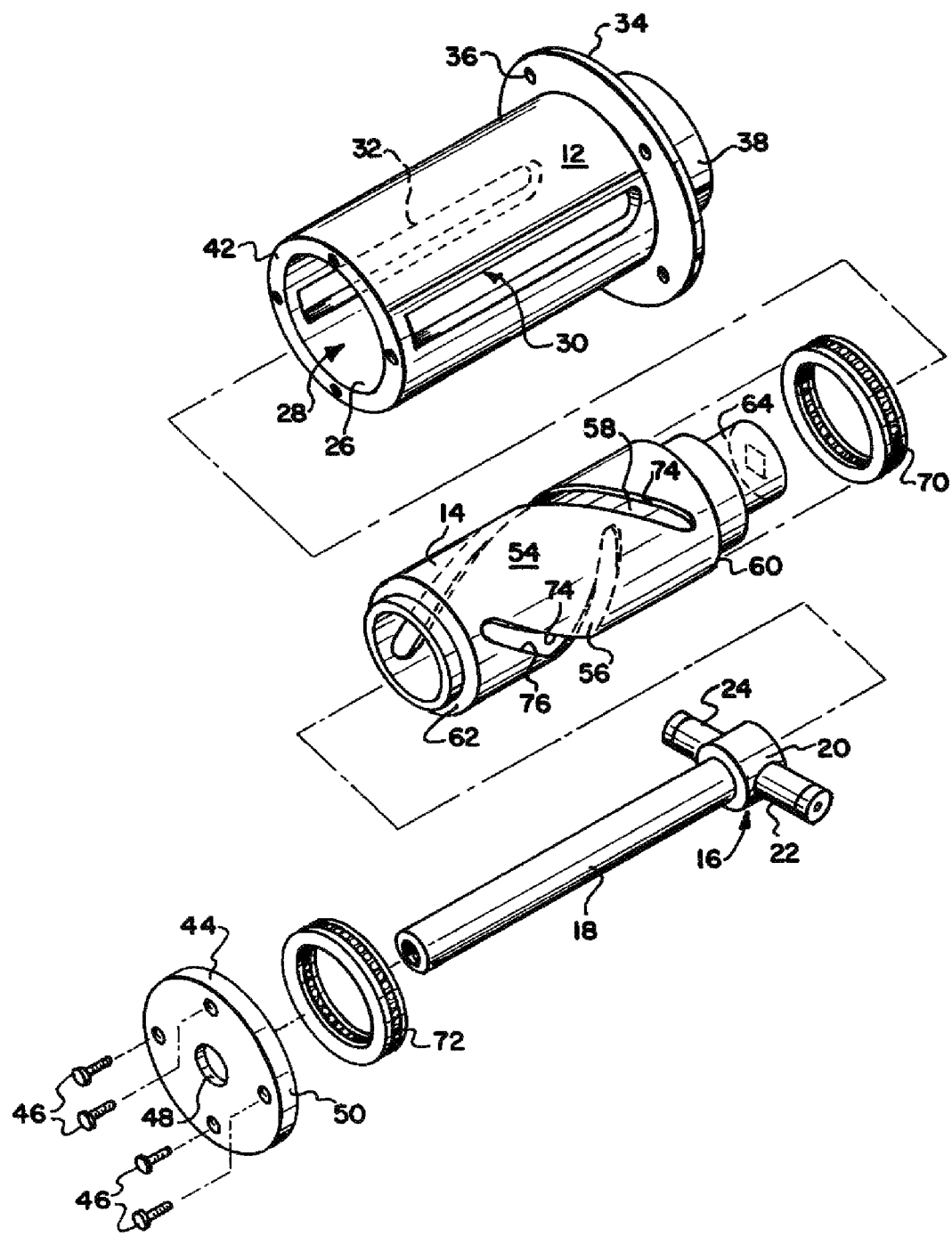
FIG. 33 is a patent drawing from circa 1981 showing a patented device that uses a helical cut design to create a rotary valve.

FIG. 32, titled, "Basic Spiral Helix Motor Slice View", shows the minimum components required for each slice of a functional helix motor. It only requires one stator pole ("Linear Array Stator Electromagnet"), and one rotor pole ("Spiral Helix Array Electromagnet") on each node, or slice of the motor. The node/slice constructs are stacked/arranged to form the linear array creating the three-dimensional form of the motor operation. Only one pole on the stator and one pole on the rotor is required for each slice/node. The virtual magnetic wave/pulse always travels parallel to the axis. A helix motor does not need an axis orbital virtual rotating magnetic wave to operate. The electromagnetic energy consumed by a helix motor always flows parallel to the axis through the stator linear array(s) as it interacts with the spiral helix magnetic array on the rotor.

Figure 34:
FIG. 34 is a partial helix motor with a single linear electromagnetic array and single spiral helix rotor magnetic array.

FIG. 34 shows one section of the Spiral Helix Electromagnetic Linear Pulse Motor and represents 90 degrees of the 360-degree Spiral Helix Magnetic Array on the driveshaft. It shows a single linear electromagnetic array parallel to the driveshaft axis across the top, supported by support beam 2505, and a single spiral helix magnetic array around the driveshaft. If three more sections were added to complete the 360-degrees spiral helix array, then it would be considered a fully formed and functional helix motor. The motivational magnetic pulse/wave creating rotation always travels parallel to the axis, even if multiple linear arrays are added for increased power. A two-dimensional axis orbiting virtual rotating magnetic field would only be created as an artifact resulting from a helix motor that has linear arrays installed completely around the circumference of the rotor construct and fully activated. Even when the total circumference of a helix motor is fully populated with linear arrays, the magnetic wave pulse for each linear array always traverses parallel to the axis. The rotor would still have only one pole unless a shorter helix motor were needed in a limited space application and then a two spiral helix motor can be designed. Two poles on the rotor are the most that would ever be needed in a helix motor design. One pole on the rotor produces the highest revolutions per minute potential with the lowest thermal signature. Power is determined by the length of a helix motor, not the number of poles on the rotor.

Figure 35:
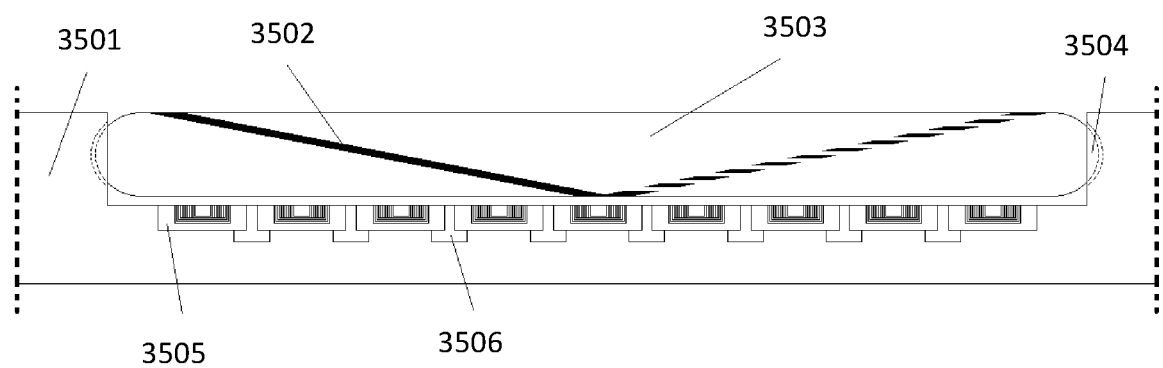
FIG. 35 is a basic components and layout drawing of a nano scale Spiral Helix Electromagnetic Linear Pulse Motor.

FIG. 35, is a basic nano scale Spiral Helix Electromagnetic Linear Pulse Motor. (The drawing is not scaled.) The basic fabrication material (3501) consists of layered semiconductor material such as silicon using conventional semiconductor production technology. The driveshaft/rotor cylinder (3503) consists of the same types of semiconductor material as the base. The spiral helix magnetic construct array (3502) on the driveshaft/rotor (3503) consists of iron compounds such as iron oxide. The electromagnets (3503) are lined up below the driveshaft/rotor (3503) with the minimum gap that can be achieved that prevents contact. The dimple bearings (3504) provide retention and stability of the driveshaft/rotor (3503) adjacent to the electromagnets (3505). The sequence control circuitry (3506) creates a timing delay between activations for each electromagnet creating the linear magnetic pulse traversing down the linear array.

Figure 36:
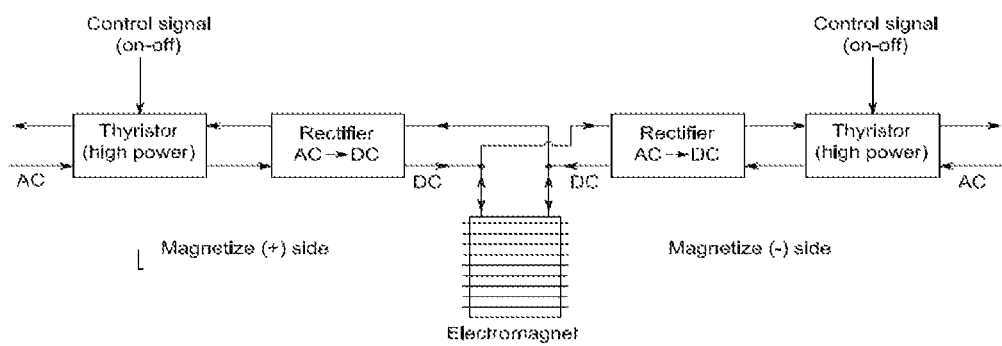
FIG. 36 is a basic electrical circuit diagram for powering the electromagnets on the linear array for an alternating current powered helix motor.

FIG. 36 is the basic control circuitry for the individual electromagnets on the linear electromagnet array. To give individual control for each electromagnet on the linear array(s), every electromagnet requires its own on off switch. The alternating current is controlled by a thyristor which under control signals, sends AC power to a rectifier which converts the electrical power from AC to Direct Current which then powers the electromagnet. This type of circuit allows the electromagnets to operate at a different and variable frequency from the frequency of the supplied alternating current.

One of the unique features believed characteristic of the present invention is that in order to make a more powerful motor, is to simply increase the length of the motor. The diameter of the motor does not need to increase with increasing power, but only the length. It is done by using standardized components, while being built with linear, assembly line construction methods. A change required for longer or shorter motors though, is that the curve of the spiral helix magnet array needs to be changed to match the designed length of the motor. The designed voltage, and/or amps, and/or motor diameter, can remain constant for Spiral Helix Motors of different designed output power levels. The average energy density and thermal loads, does not increase with increasing power output levels. The motor output power capability, is mostly determined by the length of the spiral helix rotor. The main constraint on output power, is the inherent strength of the drive shaft components design, and material(s).

Another unique feature believed characteristic of the present invention, is the ability to operate with a single linear magnet array in operation, and with a single spiral helix magnet array on the rotor operating. It does not form an orbital magnetic path for each magnet node/slice/pole, but only a single magnetic pole reversal per revolution, per spiral helix rotor. It's operation is linear in nature. Depending on the design, a fully populated motor with linear electromagnet arrays covering the full 360 degrees available, creates a secondary virtual orbital pulse for each magnet node/slice/pole, as in the way a conventional orbital pulse motor functions.

The Spiral Helix Motor operates under full digital control. As a result there is complete control of a Spiral Helix Motors operating parameters. Rotational control includes the following 1. Will start in any rotational position, in any direction, at any power/torque level from maximum to minimum. 2. The ability to initiate full reverse at maximum torque at any rotational speed. 3. The ability to hold any position. 4. The ability to apply graduated levels of torque and rotational speed. 5. The ability to apply maximum torque at maximum designed rotation speed. 6. The ability to have infinite variable rotational speed from zero to designed maximum rotation speed. 7. When negative back torque exceeds available positive torque, motor maintains maximum available torque, and rotates backwards until negative back torque drops below available positive torque, and then it rotates in the desired direction. It acts like a "shock" absorber. 8. The ability to function with a high percentage of electromagnets on the linear arrays disabled because of faults and/or programmed disability. The operational parameters are under full digital control, and rotational performance characteristics are determined by the end users desired power delivery needs.

The particular embodiments disclosed above are illustrative only, as the embodiments may be modified and practiced in different but equivalent manners apparent to those skilled in the art having the benefit of the instructions herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A spiral helix electromagnetic linear pulse motor, comprised of, and/or including, a central driveshaft/rotor composed of elemental and/or compounds of iron, and/or carbon, and/or silicon, and/or titanium, and/or aluminum, and/or elements and/or compounds with a structurally solid rigid phase, in an uninterrupted axis linear length section, and/or segmented connected axis linear length sections, of uniform and/or variable diameter, supported by load bearing, low friction, driveshaft/rotor bearings including, but not limited to, roller bearings, with the driveshaft/rotor bearing support structure composed of high strength materials commiserate with the strength of the driveshaft/rotor materials utilized, creating a rigid, solid support structure of a foundry cast nature, and/or of a fabricated nature, a spiral array(s) of individual driveshaft/rotor magnetic fabrications, including electromagnet composition, and/or of squirrel type induction construct and/or of wound type induction composition construct, and/or of permanent magnet composition construct, and/or iron compound inlay composition construct, attached to the driveshaft/rotor metallurgically and/or mechanically, with additional magnetic fabrications of same construct type, attached along the driveshaft/rotor with an axis linear angular offset from the previous attached magnetic fabrication, completing a minimum of 360-degree full spiral helix of magnetic fabrications around/along the driveshaft/rotor constructing a spiral helix magnetic fabrication array for the helix motor driveshaft/rotor, a linear electromagnetic array(s) created by wound laminated silicon electric steel electromagnet fabrications supported by structures of materials commiserate with the strength of driveshaft/rotor materials utilized, of ground based support structure, and/or girder based support structure, and/or suspension based support structure, creating a rigid structure with the electromagnet fabrications being supported adjacent to each other, aligned parallel to the driveshaft/rotor axis creating linear array(s) of individual adjacent electromagnets parallel to the driveshaft/rotor axis, with each of the linear array individual/discrete electromagnets on the same axis orbital plane as the opposing spiral helix array individual magnetic fabrications, with the minimum physical gap for nonphysical contact between the linear stator electromagnets and the driveshaft/rotor spiral helix individual magnetic fabrications forming the spiral helix magnetic array, with a continuous outside supply of a designated voltage and amps of electricity, the axis linear stator electromagnets are energized, polarity reversed, and deenergized in linear sequence creating a virtual linear electromagnetic pulse traversing across the linear electromagnetic array(s) parallel to the driveshaft/rotor axis, while sequentially, magnetically interacting with the single spiral helix magnetic fabrication array, and/or multiple spiral helix magnetic fabrication array(s) attached to the driveshaft/rotor, with continuous axis rotation achieved by repeating the sequential linear array electromagnetic pulse for normal uninterrupted operation, and as such, converts supplied electromagnetic energy, by rotating the driveshaft/rotor around its axis, producing continuous useful mechanical rotational torque.

* * * * *